US011575714B2

(12) United States Patent
Weiss et al.

(10) Patent No.: US 11,575,714 B2
(45) Date of Patent: Feb. 7, 2023

(54) DIVIDING A DATA PROCESSING DEVICE INTO SEPARATE SECURITY DOMAINS

(71) Applicant: Pulse Secure, LLC, San Jose, CA (US)

(72) Inventors: Yoav Weiss, Petach Tikva (IL); David Goldschlag, Silver Spring, MD (US); Karl Ginter, Beltsville, MD (US); Michael Bartman, Potomac, MD (US)

(73) Assignee: Pulse Secure, LLC, San Jose, CA (US)

( * ) Notice: Subject to any disclaimer, the term of this patent is extended or adjusted under 35 U.S.C. 154(b) by 0 days.

(21) Appl. No.: 17/513,732

(22) Filed: Oct. 28, 2021

(65) Prior Publication Data

US 2022/0053027 A1 Feb. 17, 2022

Related U.S. Application Data

(63) Continuation of application No. 16/707,259, filed on Dec. 9, 2019, now abandoned, which is a continuation of application No. 13/710,261, filed on Dec. 10, 2012, now Pat. No. 10,511,630, which is a continuation-in-part of application No. 13/316,426, filed on Dec. 9, 2011, now Pat. No. 8,931,042.

(60) Provisional application No. 61/727,095, filed on Nov. 15, 2012, provisional application No. 61/678,677, filed on Aug. 2, 2012, provisional application No. 61/421,693, filed on Dec. 10, 2010.

(51) Int. Cl.
*H04L 29/06* (2006.01)
*H04L 9/40* (2022.01)

(52) U.S. Cl.
CPC .................................. *H04L 63/20* (2013.01)

(58) Field of Classification Search
None
See application file for complete search history.

(56) References Cited

U.S. PATENT DOCUMENTS

| 7,561,586 | B2 * | 7/2009 | Wang | H04L 12/4608 370/467 |
|---|---|---|---|---|
| 8,095,786 | B1 * | 1/2012 | Kshirsagar | H04L 63/0272 713/151 |
| 8,544,084 | B2 * | 9/2013 | Owen | G06F 21/6245 726/19 |
| 8,656,016 | B1 * | 2/2014 | Bender | G06F 21/6218 709/225 |
| 8,661,531 | B2 * | 2/2014 | Owen | H04L 63/102 726/19 |
| 8,931,042 | B1 * | 1/2015 | Weiss | G06F 21/53 726/1 |
| 8,996,856 | B2 * | 3/2015 | Amit | H04L 63/0272 713/151 |

(Continued)

*Primary Examiner* — Jeffery L Williams

(57) ABSTRACT

This invention provides secure, policy-based separation of data and applications on computer, especially personal computers that operate in different environments, such as those including personal applications and corporate applications, so that both types of applications can run simultaneously while complying with all required policies. The invention enables employees to use their personal devices for work purposes, or work devices for personal purposes. The secure, policy-based separation is created by dividing the data processing device into two or more "domains," each with its own policies. These policies may be configured by the device owner, an IT department, or other data or application owner.

20 Claims, 13 Drawing Sheets

(56) References Cited

U.S. PATENT DOCUMENTS

| | | | | |
|---|---|---|---|---|
| 10,511,630 B1* | 12/2019 | Weiss | | H04L 63/20 |
| 2005/0063411 A1* | 3/2005 | Wang | | H04L 12/4608 |
| | | | | 370/437 |
| 2006/0242305 A1* | 10/2006 | Alnas | | H04L 69/329 |
| | | | | 709/227 |
| 2007/0174285 A1* | 7/2007 | Dutta | | G06F 21/6227 |
| | | | | 707/999.009 |
| 2008/0034418 A1* | 2/2008 | Venkatraman | | H04L 63/0227 |
| | | | | 726/15 |
| 2008/0066148 A1* | 3/2008 | Lim | | H04L 63/10 |
| | | | | 726/1 |
| 2008/0162698 A1* | 7/2008 | Hopen | | H04L 45/14 |
| | | | | 709/226 |
| 2009/0119541 A1* | 5/2009 | Inoue | | G06F 11/2028 |
| | | | | 714/10 |
| 2012/0005746 A1* | 1/2012 | Wei | | H04W 12/086 |
| | | | | 726/15 |
| 2012/0036220 A1* | 2/2012 | Dare | | H04L 67/01 |
| | | | | 709/217 |
| 2012/0036552 A1* | 2/2012 | Dare | | H04L 41/0803 |
| | | | | 726/1 |
| 2012/0079423 A1* | 3/2012 | Bender | | G06F 9/44505 |
| | | | | 715/804 |
| 2012/0079609 A1* | 3/2012 | Bender | | H04L 63/105 |
| | | | | 726/30 |
| 2012/0144196 A1* | 6/2012 | Owen | | H04L 63/0442 |
| | | | | 713/168 |
| 2012/0291089 A1* | 11/2012 | Bomgardner | | G06F 21/6236 |
| | | | | 726/1 |
| 2013/0160072 A1* | 6/2013 | Reus | | H04L 63/102 |
| | | | | 726/1 |
| 2013/0297700 A1* | 11/2013 | Hayton | | G06Q 10/10 |
| | | | | 709/204 |
| 2013/0339724 A1* | 12/2013 | Amit | | H04L 63/0272 |
| | | | | 713/151 |
| 2014/0007222 A1* | 1/2014 | Qureshi | | H04L 67/10 |
| | | | | 726/16 |
| 2014/0059703 A1* | 2/2014 | Hung | | G06F 21/54 |
| | | | | 726/28 |
| 2015/0200930 A1* | 7/2015 | Linga | | G06F 21/44 |
| | | | | 726/5 |
| 2017/0147825 A1* | 5/2017 | Barton | | H04W 12/37 |
| 2018/0084060 A1* | 3/2018 | Xie | | H04L 67/56 |
| 2018/0329698 A1* | 11/2018 | Jawa | | G06F 21/54 |

* cited by examiner

Loader and Target App Classes In Memory (Proxy Method)

Loader and Target App
Classes In Memory
(Inheritance Method)

Dynamic Check-Based Access

DIVIDING A DATA PROCESSING DEVICE INTO SEPARATE SECURITY DOMAINS

1 CROSS REFERENCE TO RELATED U.S. PATENT APPLICATIONS

This application is a continuation of U.S. application Ser. No. 16/707,259 filed Dec. 9, 2019, which is a continuation of U.S. application Ser. No. 13/710,261 filed Dec. 10, 2012, which claims priority to provisional U.S. Application Ser. No. 61/727,095, filed Nov. 15, 2012, and U.S. Application Ser. No. 61/678,677 filed Aug. 2, 2012, and further claims priority to U.S. patent application Ser. No. 13/316,426, filed Dec. 9, 2011, now U.S. Pat. No. 8,931,042, which application claims priority to provisional U.S. Patent Application Ser. No. 61/421,693, filed Dec. 10, 2010. The disclosure of each aforementioned patent applications is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2012 Cellsec Security Limited.

3 BACKGROUND OF THE INVENTION 3.1 Field of the Invention

The present invention relates to the field of computing, and more particularly, to policy handling and distribution, and to policy-driven information (data) segregation in portable computing devices, such as, but not limited to, "smart" phones, tablet computers, and personal digital assistants ("PDAs").

3.2 The Related Art

With the advent of a wide variety of portable computing devices, such as PDAs and smart phones, and the proliferation of these devices for business purposes, control over applications and information has become more difficult for central information technology ("IT") departments. In particular, many employees desire to use their own devices in their jobs for a number of reasons, including: the greater merging of work and home lives leading to a need to include both personal and work-related information on a single device to avoid using multiple devices (e.g., having two cell phones or PDAs), the higher degree of technical sophistication of employees and their greater independence from IT departments, and the increasing use of technology as a means of self-expression. The trend towards BYOD ("bring your own device") creates a challenge for IT departments, not only for maintaining control over multiple device types from a plurality of manufacturers, but also for protecting sensitive data and access to data on secure servers or other enterprise resources.

Application program ("app") use typically involves one or more types of data, such as configuration settings for the application and/or the device, data to be manipulated or used by the application, or output from the application. (The term "data" is used herein to refer to any or all types of information associated with a specific application instance.) Regardless of ownership, portable computing devices often have a mix of enterprise and personal applications and information. It is difficult to maintain separation between enterprise information and personal information using currently available methods. In some cases, a portable computing device also may contain applications and information belonging to other entities, such as clubs, volunteer organizations, schools, etc. Therefore, it is useful to have a mechanism that can establish and manage one or more segregated application and information "domains" on portable computing devices, each such segregated domain encompassing a defined set of applications and information accessible within that domain that are kept isolated from the applications and information external to the domain unless permitted to be shared; the domain being further associated with a domain-specific policy that specifies required controls over the applications and information that are part of the segregated domain. Capability must exist to define the set of applications and information accessible within a domain in a flexible manner that is not necessarily tied to OS protection mechanisms such as user ID numbers, user groups, or file system access protection settings, or to storage locations such as directories. It is also useful to be able to independently extend such domains to encompass applications and information on other devices, such as enterprise servers, mobile devices of co-workers or friends, or third party services such as DropBox or SalesForce, while maintaining the defined application and information segregation in a policy-controlled manner.

Applications are typically run as "processes" on portable computing devices, and can be assigned various levels of resource usage, such as processor time or memory, by an operating system (OS) on the portable computing device. Applications call the OS or service daemons to provide various functions, such as access to data files or peripheral devices, network connections, inter-process communication, allocation of resources, etc. On some portable computing devices, these calls make direct reference to the OS. In other portable computing devices, these calls are made through dynamic or statically loaded library function calls, service processes, or other well-known methods. Applications running on portable computing devices may have OS-level protections applied to them (when these protections exist for the portable computing device). These OS-level protections provide access-controls to specific resources. OS-level protections do not limit how applications can share information (they limit access, not usage), nor do they limit how the data can be communicated and/or stored.

Some portable computing devices utilize virtualization technologies in which applications and their data are segregated into disparate virtual machines. Applications implemented using virtualization techniques can be isolated from each other and rendered unable to communicate and/or share information outside of the virtual machine by not provisioning the virtual machine with communication facilities or access to storage shared with other systems; this can provide control over applications and data But in many cases some level of sharing is desired, such as to transfer or share user interface preferences or authorizations, or to introduce data to process or to extract processed data, and provision of communication facilities or access to storage shared with other systems is necessary for these purposes. Once such connectivity or sharing is arranged, however, the isolation of the virtual machine is removed and control over applications and data becomes problematic. Networking and storage sharing facilities do not typically provide application- or data-level access control, or control over use of data. If any control is provided, it is likely to be at the network node level, such as by limiting connectivity between nodes, or limited to OS-level data protections, such as user ID numbers, file protections, or user groups. These do not permit flexible specification of applications and data or the permitted uses of data. They can not specify, for example, that a particular file may be read by a first application, but not written to by it, that a second application may read or write the file, but that neither application may transfer the file over a network link unless that link goes over a virtual private network (VPN) to a specific destination. These limitations, and the typical need to provide networking or storage sharing facilities that exhibit them to virtual machines in order to make the virtual machines useful, result in virtualization alone being insufficient to solve the problem of application and data control.

Even when a portable computing device can be configured to maintain applications and data separately, the problem of controlling owned data still is not solved: The application can only enforce required policies on the data for itself while it is running; it cannot prevent other applications from treating the data in ways that violate the data owner's policies, especially when it is not running. Application enforcement of information policies thus is neither persistent nor pervasive, and is therefore inadequate for the needs described above. For example, if a Post Office Protocol (POP) e-mail client were written to keep messages received from a first mail server separate from those received from a second mail server, and to permit forwarding of a message only through the mail server it was received from, there may be nothing to prevent a different e-mail client or a file transfer application from sending the stored messages or message files to a third server. Policy enforcement must be both persistent and pervasive to be effective.

Summarizing, current portable computing devices do not:
Recognize a plurality of owners of the applications and data stored or used on the device;
Provide for a combination of external and locally resident policy elements to define and enforce application and information segregation;
Segregate applications and information in accordance with policy-defined requirements;
Provide mechanisms for persistent and pervasive control over applications and information subject to policy control; or
Provide mechanisms for fine-grained control over operations by and between applications operating on the device or between applications operating on the device and other applications or services that exist off of the device.

What is needed is a computing solution that isolates application information according to policy requirements and provides distinct improvements over existing portable computing device architectures by dynamically enabling one or more policy controlled "domains," each comprising one or more applications and their information. The present invention meets these and other needs.

4 SUMMARY OF SOME EMBODIMENTS OF THE INVENTION

In a first aspect, the present invention provides a method for operating a computer data processing device in two or more data security domains. In one embodiment, the invention provides a method for operating a computer data processing device in two or more data security domains. In one embodiment, the method provided by the present invention comprises providing in data memory associated with said computer data processing device at least one external policy defining a first domain; associating a first computer data processing device application with said first domain; providing at least one persistent control mechanism, said control mechanism being implemented without modifying said application and without requiring operating system privileges, over said computer data processing device application associated with said first domain, said persistent control mechanism being subject to policies defined for said first domain; providing at least one mechanism for fine-grained policy-based control over operations by, and between, said first computer data processing device application; and providing a first domain import-export policy enforcement point, said first domain import-export policy enforcement point being in communication with said first computer data processing device application.

In more specific embodiments, the method further comprises providing a second computer data processing device application. Still more specifically, the method of still further comprises providing a second domain import-export policy enforcement point, said second domain import-export policy enforcement point being in communication with said second computer data processing device application. Yet still more specifically, the method further comprises providing a second domain group, said second domain group including said second computer data processing device application, said second domain import-export policy enforcement point, and said second domain.

In another aspect, the present invention provides a computer data processing device configured to operate securely in two or more data security domains. In one embodiment, the device comprises data memory associated with said computer data processing device holding at least one external policy defining a first domain; computer processor instructions effective to associate a first computer data processing device application with said first domain; computer processor instructions for receiving at least one persistent control mechanism, said control mechanism being implemented without modifying said application and without requiring operating system privileges, over said computer data processing device application associated with said first domain, said persistent control mechanism being subject to policies defined for said first domain; computer processor instructions for providing at least one mechanism for fine-grained policy-based control over operations by, and between, said first computer data processing device application; and computer processor instructions for providing a first domain import-export policy enforcement point, said first domain import-export policy enforcement point being in communication with said first computer data processing device application.

In a third aspect, the present invention provides a non-transitory computer-readable medium containing a computer program product for operating a computer data processing device configured to enable said computer data processing device to operate securely in two or more data security domains and configured to enable said computer data processing device to perform actions comprising providing in data memory associated with said computer data processing device at least one external policy defining a first domain; associating a first computer data processing device application with said first domain; providing at least one persistent control mechanism, said control mechanism being implemented without modifying said application and without requiring operating system privileges, over said computer data processing device application associated with said first domain, said persistent control mechanism being subject to policies defined for said first domain; providing at least one mechanism for fine-grained policy-based control over operations by, and between, said first computer data processing device application; and providing a first domain import-export policy enforcement point, said first domain import-export policy enforcement point being in communication with said first computer data processing device application.

These and other aspects and advantages will become apparent when the Description below is read in conjunction with the accompanying Drawings.

5 BRIEF DESCRIPTION OF THE DRAWINGS

The features of the present invention will best be understood from a detailed description of the invention and example embodiments thereof selected for the purposes of illustration and shown in the accompanying drawings in which.

6 DESCRIPTION OF SOME EMBODIMENTS OF THE INVENTION

6.1 Overview

Figure 1:
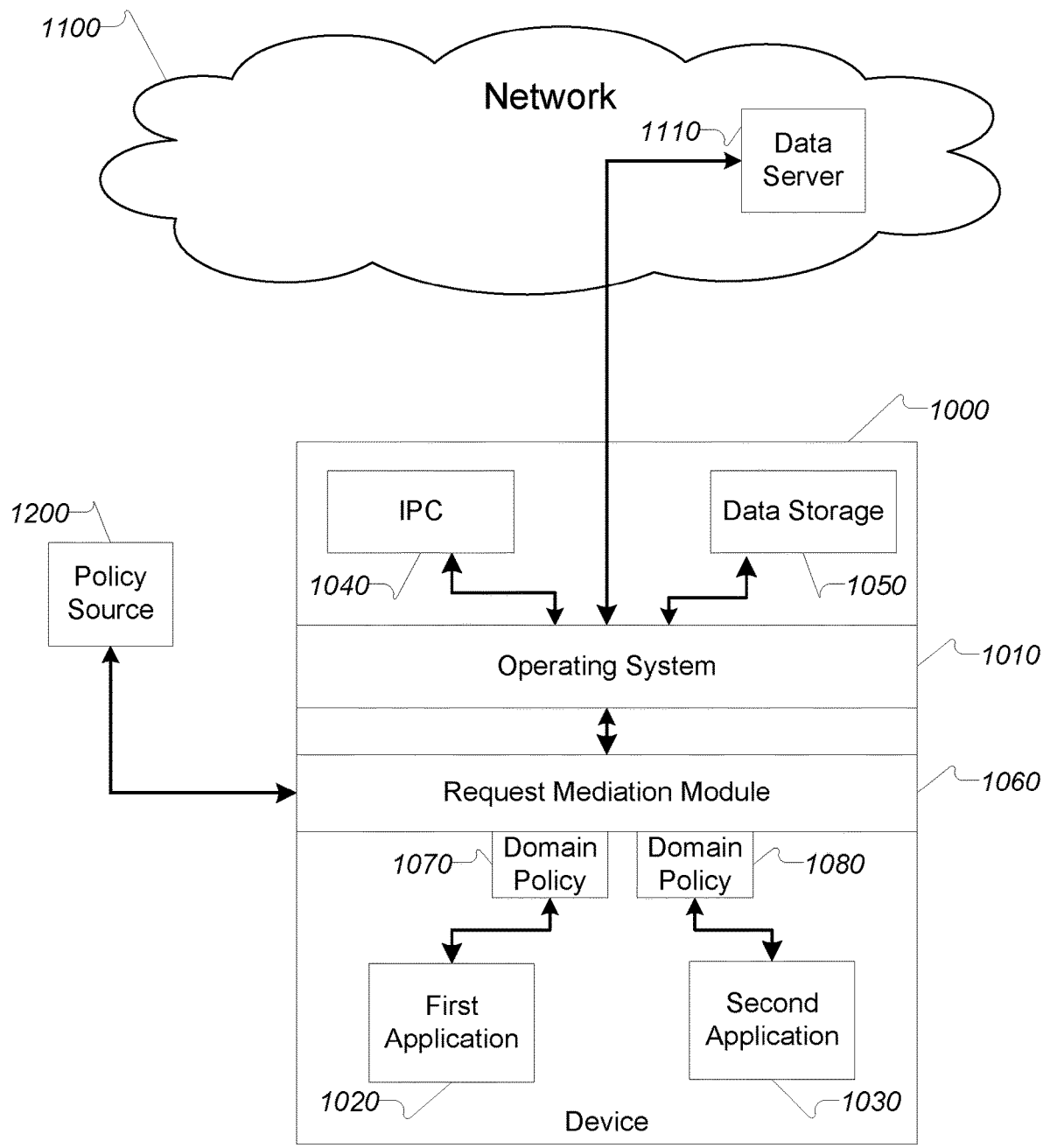
FIG. 1 depicts a diagram of a data processing device utilizing the invention and elements of its operating environment in accordance with the present invention.

The present invention meets the needs of providing highly flexible computer-implemented security and data control policies for disparate computing devices. As will be understood by those having ordinary skill in the art, the system and methods of the inventions described herein provide capabilities for portable computing devices to:

Recognize a plurality of owners of the applications and information stored on the device;

Provide for a combination of externally and locally provided policy comprising policy elements that specify application and information segregation into logical "domains,"

Associate applications and information with one or more "domains" in accordance with the policy-defined control specifications;

Provide mechanisms for persistent control over applications and information associated with a domain according to policies defined for that domain; and Provide mechanisms for fine-grained policy-based control over data operations by and between applications operating on the device.

As used herein, a "domain" is a persistent logical construct that describes the persistent segregation of applications and associated data in a computer's memory, defined by at least one policy element of a policy, which identifies one or more applications, their associated data, and permitted operations by those applications upon the associated data as well as communications with other applications in the domain and with applications and systems outside of the domain. A domain definition is provided by one or more policy elements of a domain's policy.

In some aspects of the present invention, a given device can support an arbitrary number of domains simultaneously, each domain having its own policy, applications, and their data. Control provided by a domain over the applications in the domain serves to control the data associated with those applications. For example, if an application is required to store its data in a particular way, such as encrypted with a domain-specific key, then the data can only be read by applications in that domain, and the operations permitted to those applications can be specified in the domain policy. Control over the applications and the data is therefore provided by the domain policy. An application can be recognized as belonging to a single domain, to a plurality of domains, or to no domain. For example, a given device might have a domain for applications that deal with an employer's data, a domain for applications dealing with data belonging to a volunteer organization that the user works with, and applications that deal with personal data that are not associated with any domains. In a more complex example, a consultant may be employed by several enterprises, each managing its own domain with its own policy on the consultant's device, without affecting the other domains.

According to some embodiments of the present invention, in order to persistently create and enforce a domain's specified application and data segregation policy, the applications and data belonging to each domain are segregated from the applications and data of other domains in a manner that requires cooperation between the applications of both domains to enable sharing of data between them. Because interactions between the applications of the domains are mediated to permit only those operations allowed by the respective domain policies, all sharing will be within policy-defined limits and policy will specify control of applications and their data.

As will be understood by those having ordinary skill in the art upon reading further herein, limiting applications in accordance with policy requires, among other things, that the mechanisms used by applications to access, store, or share data, such as reading or writing locally stored data, reading or writing remotely stored data over a network, sharing data with other applications locally or remotely by inter-process communication (IPC), or any other means, be mediated so as to ensure that only data access, storage, or sharing requests made by an application that are in compliance with the associated domain policy are passed for service (execution), and that those requests that are not in compliance with the associated domain policy are not passed. In some exemplary embodiments, requests that are not in compliance may be modified to make them compliant with the associated domain policy, allowing the modified request to be passed for service.

One exemplary method for achieving this is to dynamically or statically associate applications and/or data with policy-defined "domains." Methods for associating applications and data with policy-defined domains are described in more detail below.

In some embodiments, domains are further defined based, for example, upon their required attributes, including, for example, the persistent protection of data at rest, connection limitations, etc. Domains that require segregation, persistent protected storage, or network isolation, are called "restricted." Those domains that do not have this requirement are called "unrestricted."

6.2 Definitions

The following definitions are used throughout, unless specifically indicated otherwise:

| TERM | DEFINITION |
| --- | --- |
| Mediate | Mediation of operations includes the actions of permitting, blocking, or modifying at least one operation requested by an application instance. |
| Application | A program that can be operated by, or in support of operations by, a user, e.g. e-mail, web browser, or contacts database. |
| Application instance | An application, along with specific data associated with that application, such as configuration data. |
| Application process | An executing copy of an application instance |
| Domain application | An application instance that is associated with a specific domain. |
| Non-Domain application | An application instance that is not associated with any domain. |
| Policy | One or more policy elements. |
| Policy Element | One or more policy fragments. Fragments that form a policy element are typically related to a single aspect of policy, such as defining access permissions to a given file or file type, specifying network access restrictions for a device or type of device, or specifying one or more permitted applications for a domain. |
| Policy Fragment | Individual policy definitions, rules, permission or restriction specifications, specifications of scope, etc. useful for defining aspects of policies. Policy fragments can be combined to form policy elements. |
| Policy, Complete | One or more policy elements, with conflicts between policy elements resolved. |
| Policy Distribution Point | A computer implemented component of a device useable for distributing at least one policy element to one or more Policy Management Points. |
| Policy Management Point | A computer implemented component of a device capable of aggregating and resolving conflicts between one or more policy(ies) and allocating some or all portions of the resulting complete policy to one more other policy management points and/or to one or more policy enforcement points. |
| Policy Enforcement Point | A computer implemented component of a device capable of receiving a policy and enforcing the requirements specified therein using one or more policy enforcers. |
| Policy Enforcer | A computer implemented software and/or hardware component, an aspect of an operating system, a service, process, application or other employable feature on a device useful for enforcing at least one element of at least one policy. |

6.3 Exemplary System Architecture
6.3.1 Basic Architecture

FIG. 1 is a diagram showing of an exemplary embodiment of a device of the current invention (1000) with a request mediation module (1060). Request mediation module 1060 is logically located between the operating system (OS) (1010), and the application instance, represented by a first application instance (1020) and a second application instance (1030). (Note that the term "operating system" (or "OS") is used herein to refer to the operating system kernel, as well as any device drivers, supporting services, APIs, or other device aspects normally required to carry out application requests.) When an application instance (1020 or 1030) requests, using well known methods such as system calls, access to a resource capable of storing or transferring data, such as the local data storage (1050), inter-process communications (1040), or networked resources such as a data server (1110) accessed through a network (1100), the request is directed to a request mediation module to determine proper handling based on the appropriate policy for the domain of the application (1070 and 1080). Other resources (not shown) that can be similarly mediated include shared or private volatile memory, wired communications and networking interfaces, wireless communication or networking interfaces, and any other aspects of the data processing device. The foregoing elements can be provided using methods and materials known well to those having ordinary skill in the art.

Request mediation modules (1060) in some exemplary embodiments are provided on a "one-per-device" basis, where all applications are mediated by a single request mediation module and that module associates the proper domain policy with each application, without modifying the application or requiring OS privileges. In some other exemplary embodiments, request mediation modules are on a "one-per-process" basis, where each application is mediated by its own request mediation module according to the policy of its domain. In yet other exemplary embodiments, request mediation modules are domain-specific, with each domain having one or more request mediation modules used only for applications of the domain. In still other exemplary embodiments, combinations of these arrangements are used, with various request mediation modules, some that serve to mediate all applications, some that mediate individual applications, and some that mediate all applications that are in specific domains, cooperating with the others so as to enforce the mediation required by the individual domain policies. The foregoing elements can be provided using methods and materials known well to those having ordinary skill in the art.

Request mediation modules (1060) in some exemplary embodiments also can be of various types, each useful for performing a part of the policy enforcement for one or more domains. Exemplary request mediation module types include, but are not limited to, policy distribution points, policy management points, policy enforcement points, and policy enforcers. These types will now be described in more detail.

Policy distribution points are used to distribute one or more policy elements to one or more computer-implemented policy management points that are capable of aggregating and resolving conflicts between the policy elements of one or more policies and then allocating some or all portions of the resulting complete policy to one more other policy management points and/or to one or more computer-implemented policy enforcement points.

Policy enforcement points are computer implemented components of a device that are capable of receiving policy elements and enforcing the requirements specified therein using one or more policy enforcers.

Policy enforcers are computer implemented software and/or hardware components, an aspect of an operating system, a service, process, application or other employable feature on a device useful for enforcing at least one policy element of at least one policy.

In some exemplary embodiments, policy enforcement points, and optionally one or more of the policy enforcers they require, can be combined in a manner that permits their distribution to devices as needed. These are termed "distributable policy enforcement points" herein. In some of these exemplary embodiments, distributable policy enforcement points can be created as needed by a distributable policy enforcement point generator. The distributable policy enforcement point generator can be implemented as part of a policy management point or as a stand-alone component that receives policy allocations.

According to some exemplary embodiments, the distributable policy enforcement point generator receives policy allocated to it and produces one or more distributable policy enforcement points. The distributable policy enforcement points may be implemented as any type of policy enforcement point. Once generated, distributable policy enforcement points may be distributed using policy distribution points, or may be distributed using common application distribution mechanisms such as "application stores" or application repositories.

In other embodiments, a distributable policy enforcement point generator receives policy allocated to it by a policy management point. The allocated policy identifies a domain or application to be protected. The distributable policy enforcement point is then generated, optionally signed by the policy enforcement point generator, and made available to policy distribution points, "application stores" or other locations from which it can be acquired for use on a device. In implementations that make distributable policy enforcement points available through an "application store" or other application distribution point, distributable policy enforcement points are installed on devices in the same manner as any typical application that is distributed to the device using such methods. As a normal user application, distributable policy enforcement points can be installed without the need for elevated access or privileges, such as "rooting" the device. In some devices the user may be asked to approve requests for specific permissions however, such as permission to use the network facilities or to access navigation systems. This is standard behavior on such devices when installing user applications.

In some embodiments of the invention, mediation modules use certain aspects of the domain of the requesting application, the domain the data belongs to, and the policies for the application and data's domains to determine how to mediate a request. Mediation of requests includes permitting the requested operation as it was requested, blocking the request completely (e.g. returning a failure result to the requestor or ignoring the request), modifying at least one aspect of a requested operation before permitting the modified operation to proceed (e.g. altering a file name before permitting a file open request to proceed), or redirecting a request to a different function (e.g. changing a local file open request into an inter-process communication link open request). The operations, the applicable conditions, and mediation effects are defined within the policy for the domain. Requests to communicate between applications inter-, extra-, or intra-domain may be similarly described and mediated using this system. Exemplary methods used by request mediation modules to intercept and mediate application requests can vary with the design and requirements of the OS, available access to the OS, and/or implementer choices as described below.

In some embodiments, request mediation modules are pre-installed as part of initial device software loading, or are installed on the device at a time subsequent to the initial device software load and are bound to the OS, or are installed with, as part of, and/or bound with one or more applications. Request mediation modules that are part of the OS are statically loaded at device boot time, or are dynamically loaded as needed, depending on the needs and design of the OS. Request mediation modules that are bound with an application are loaded with or prior to each application instance, or they can be loaded the first time an application instance is requested. In some exemplary embodiments, aspects of a request mediation module are loaded as part of an application instance while other aspects of a request mediation module are loaded as part of the OS, or are loaded as needed.

In certain embodiments, request mediation modules associate a domain with one or more application instances, and mediate one or more operations based on the policy specified for that application in that domain. Unlike traditional access controls and similar systems, request mediation modules may be associated with specific application instances, applications, data, operations, or other domain policy-defined items. Limiting the scope of the mediation to specific applications and operations (as opposed to system-wide limitations) makes the system more efficient, makes the mediation module easier to secure, and reduces the number of policy conflicts that must be resolved within the module.

In some embodiments, request mediation modules intercept requests made by application instances and determine whether the requests are in compliance with relevant policies for the domain of the application and the data it is trying to access.

With continuing reference to FIG. 1, the policies used by the request mediation module are supplied by a policy source (1200). In various embodiments, the policy source (1200) is a network policy server, a removable storage device which contains policy elements, a cache of policy elements located in local device storage (e.g. in flash memory, on an SD card, etc.) or operating system-controlled memory operably attached to the local computer processor such as RAM, ROM, or electrically erasable ROM; configuration settings made by the device user or other person or system with access to the device settings, or any combination of these or other means of providing one or more policy elements as determined to be appropriate by those with skill in the art. In some embodiments, policy elements received by a request mediation module (1060) are applied by the request mediation module to domains as specified by the policy source and/or the policy elements.

The foregoing elements can be implemented by those having ordinary skill in the art using the disclosure provided herein.

6.3.2 Request Mediation Methods

The mechanisms used to enable request mediation modules (described above) to intercept requests made by application instances depend on the design of the OS and the mechanisms used by applications to make requests. Some exemplary methods for some typical OS designs are described below. These can be implemented by those having ordinary skill in the art using the disclosure herein.

6.3.2.1 OS Embedding

In some exemplary embodiments, a request mediation module and its associated policy/domain association logic is embedded within the OS itself, and is called as a matter of course during the dispatch of OS calls from the application instance to the OS. In some embodiments, the request mediation module is linked into the OS; in other embodiments the request mediation module is dynamically loaded by the OS at boot time or as needed.

In some alternate embodiments, a request mediation module is associated with a structure in the OS designed to support pluggable mediation modules. In the same manner as a file system driver, a request mediation module may register with the OS to receive specific OS calls and be passed those calls as needed.

6.3.2.2 OS Module Attachment

In exemplary embodiments for OSs that use system calls, whether made by pure software means, or with the assistance of special CPU hardware features, a technique known among those having ordinary skill in the art as "vector hooking" is used; this involves replacement or modification of one or more references to existing system calls in order to redirect OS calls to a replacement function or functions. The original pointers can be preserved for use by the replacement functions if the original functionality is required before, during, or after the processing done by the replacement functions. The specifics of how to use vector hooking on any given OS are well known to those with ordinary skill in the art. For example in some OSs there are OS facilities provided to request replacement or extension of OS features by redirecting OS calls to user-provided modules. In other OSs the vectors used to make system calls are stored at known hardware addresses, and are simply replaced by vectors pointing to new functions.

In this exemplary embodiment of integrating a request mediation module with an OS using vector hooking, the OS functions that are mediated (i.e. that can be referred to within an allocated policy) are replaced by references to mediation module functions. When invoked by a "hooked" request, mediation module functions examine the request in light of the policy associated with the domain of the requesting application, and then block the request, pass the request to the original OS function, modify the request before passing it to the original OS function, or redirect the request, or a modified version of it, to a different function. Redirection or modification of requests is done in an OS-specific manner. For example, in some OSs request parameters are passed in CPU registers and modification of the request is done by altering the contents of those registers. In other OSs request parameters are passed in allocated memory blocks, and altering the request is done by changing the contents of those memory blocks or substituting different memory blocks. Those with skill in the art will understand how requests are passed for any given OS, and how to modify requests for the OS. Requirements for modification of requests are derived from domain policy. In some cases domain policy elements will provide values to substitute (e.g. a directory path in which to store data, the name of a VPN server to connect with, etc.). In other cases domain policy elements will provide inputs for computations that determine values to substitute (e.g. a minimum protection level that must be assigned to a data file, a maximum lifetime for a calendar entry from which to compute an expiration date, etc.)

6.3.2.3 Application Loader Modification

In some exemplary embodiments, the application loader is modified to set up the redirection of application requests to one or more request mediation modules at the time the application instance is loaded. This may be accomplished by the modified application loader "patching" the application during the load process, or by the application loader providing alternate service locations that reference a request mediation module in place of one or more external calls made in the application. These alternate service locations can be provided using a "shim" application, the mediation module, another aspect of the OS, and/or a loadable library that defines one or more alternatives to the underlying system call entry points. In some exemplary embodiments, the redirections provided to loaded applications are determined by domain policy of the domain the application is associated with.

When an OS application loader is modified to enable redirection of application requests to request mediation modules, it must do so only for applications that are associated with a domain. Applications that are not associated with any domain should not be modified, and should continue to load as if the OS application loader had not been modified.

6.3.2.4 Application Modification

In other exemplary embodiments, the applications themselves may be modified to directly access a request mediation module. This requires access to the application source code, or an ability to modify an executable application. Such implementation details will be known to those having ordinary skill in the art.

Modifications made to applications so as to cause access to request mediation modules can be done manually by programmers in some exemplary embodiments. In other exemplary embodiments, such modifications can be made automatically. Modifications can also be made in various exemplary embodiments prior to installation of the application, during application installation, after installation of the application, at the time the application is loaded for execution, or at various combinations of these times with some modifications being made at one time, and other modifications being made at other times. For example, a modification that causes an application to notify a run-time system of its domain might be made at the time the application is installed, while a modification that cause the application to use a particular VPN might be made at the time the application is loaded, to account for potential changes in domain policy with respect to VPN use.

6.3.2.5 Service Manager Attachment

In exemplary embodiments for OSs that use a service manager service to enable application instances to identify the services to call for various functions, a request mediation module can be divided into at least two components: a secured service manager service and one or more secured services. The secured service manager service replaces the original OS service manager service. Such embodiments can be implemented by those having ordinary skill in the art using the disclosure herein.

When an application instance requests a pointer to a particular service from the secured service manager service, the secured service manager service decides, based on the application instance domain and its policy, whether to provide the application instance a pointer to a request mediation module secured service, or to the corresponding original OS service. In alternate exemplary embodiments, a plurality of secured services each provides the services for application instances in different domains.

The secured services can provide the requested service themselves, block them, or modify the requests prior to sending them to the original OS services and optionally modify any responses returned from the original OS service to the application instance.

6.3.2.6 Shared Memory Attachment

In exemplary embodiments that use shared memory regions for communication between application instances and OS services, one method for intercepting requests is to replace, by means such as vector hooking (see above), the portion of the OS service that receives notification of requests, and/or which reads requests from a shared memory buffer, with portions of a request mediation module. These embodiments can be implemented by those having ordinary skill in the art using the disclosure herein.

When an application instance requests a function from the OS service, it writes a request description to a shared memory buffer. Then, optionally, it sends a notification to the OS service that a function is being requested. This notification can be, for example, an ioctl( ) call on a shared device, a signal, such as SIGUSR1 on a Unix-like system, a designated synchronization object such as a semaphore or a mutex, or other mechanism as will be well understood by those with skill in the art.

The notification is received by a security function that forms part of a request mediation module. The security function then reads and/or writes the shared memory to identify the request and mediate the request contained within it. The security function then optionally calls the requested service to process the request. Once request processing is complete, the security function of the request mediation module can modify the results recorded in the shared memory as required before alerting the requesting application instance or marking the shared memory to indicate that the request has been completed.

6.3.2.7 Messaging

In exemplary embodiments that use messaging or event queues for communication between application instances and OS services, one method for intercepting requests is to register to receive specific events placed on the event or message queue, perform mediation of those events received, and then forward the mediated events for further processing as required. These embodiments can be implemented by those having ordinary skill in the art using the disclosure herein.

6.3.3 Storage Access

Access to stored data, whether local or networked, may be mediated by a request mediation module. Depending on policy for a domain, data may be stored as written by an application, it may be encrypted as it is written, and decrypted as it is read, in a manner that is transparent to the application instance making the read or write requests, or it may be modified in other ways as it is read or written. The specifics of how this is done will vary with the method of inserting a request mediation module so as to enable it to intercept requests. These embodiments can be implemented by those having ordinary skill in the art using the disclosure herein.

6.3.3.1 OS Module Attachment

Figure 3:
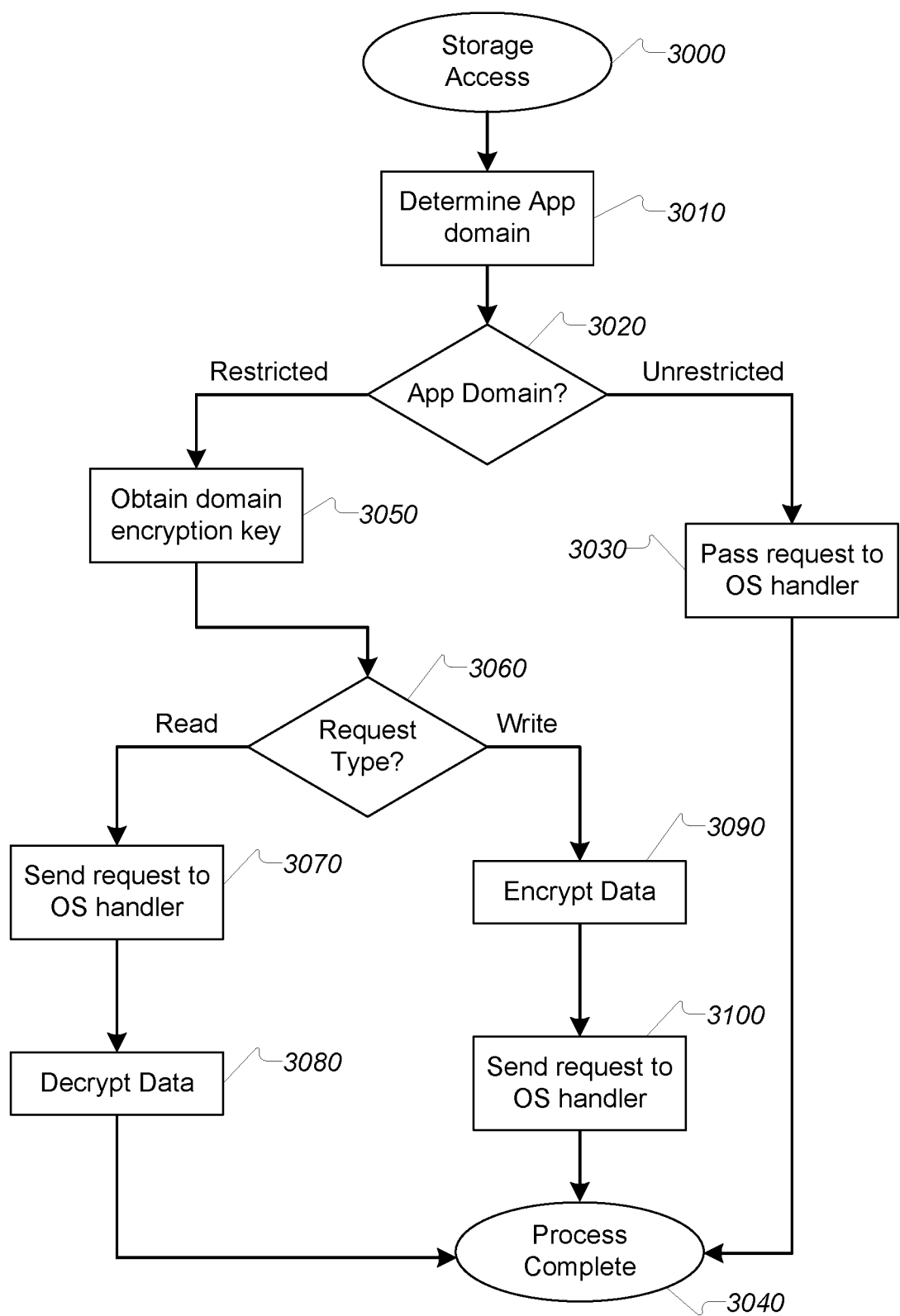
FIG. 3 depicts a flowchart of an exemplary method for accessing data in a domain in accordance with the present invention.

When using the OS module attachment method, according to some embodiments requests for storage access are sent from application instances, and intercepted by a request mediation module. The request mediation module uses a method such as the method described in FIG. 3 (3000) to mediate the request. These operations can be implemented by those having ordinary skill in the art using the disclosure herein.

The first step is to determine the domain of the application (3010). (See FIG. 2 and the accompanying disclosure in Section 6.5.) If the application instance is associated with a domain that does not require restrictions (3020), the policy permits the request mediation module to forward the request to the storage handler of the OS (3030) and the process is complete (3040).

If the application instance is associated with a domain that requires data on a persistent storage media to be encrypted, the request mediation module retrieves the domain encryption/decryption key (3050). This can be obtained from a local key cache, from the policy source (e.g. a policy or policy server), or by other means as will be known to those with skill in the art. The request type (read or write) is checked (3060). If the request is a read request (3060), the request mediation module sends the request to the OS handler (3070) to obtain the encrypted data, and then decrypts the data (3080), and returns it to the calling application instance, which completes the process (3040). If the request is a write, the request mediation module encrypts the data (3090) and then sends the request to the OS handler (3100) which stores the encrypted data, which completes the process (3040).

6.3.3.2 Process Marking Attachment

In those embodiments using the process marking attachment method, when the classification module decides that an application instance is associated with a restricted domain, it causes the OS to set up a secured process its own name space for mounted file systems. It then mounts a secured file system that encrypts all information stored on it from within this secured process name space.

When the secured process accesses the storage system, the file request dispatcher in the OS sees that it is attempting to read/write to a file on a secured file system and routes the request through the secured file system module, which automatically takes care of any encryption on writes or decryption on reads.

6.3.3.3 Service Manager Attachment

In those embodiments using the service manager attachment method, if an application requests a pointer to a service from the secured service manager service, that service identifies the application domain, and provides a pointer to the appropriate domain storage service, whether restricted or unrestricted, as required by the policy of the identified domain. When the application accesses the domain storage service, the service can encrypt and decrypt information, send written information to a remote service for backup purposes, etc as required by the domain policy. It also forwards requests, with optional modifications, to the original OS storage service.

6.3.4 Network Access

In some embodiments, access to networks is mediated by a request mediation module. Depending on policy for a domain, data may be sent as requested by an application, or it may be redirected, modified, or restricted in a manner that is transparent to the application instance making the network requests. The specifics of how this is done will vary with the method of inserting a request mediation module so as to enable it to intercept network operation requests.

6.3.4.1 OS Attachment

In those embodiments using the OS module attachment method, if a request mediation module determines that an application instance is associated with an unrestricted domain, it allows network requests by the application instance to pass unmodified to the OS network handler.

If a request mediation module determines that an application instance is associated with a restricted domain, it modifies network requests by the application instance before passing them to the OS network handler. These modifications can encrypt the data, change the destination address to a VPN gateway, or perform other modifications as required by the restricted domain policy.

6.3.4.2 Process Marking Attachment

In those embodiments using process marking, the exact method used to perform process marking attachment for network access depends on the OS configuration. In the preferred implementation, for Unix-like OSs, the OS comprises the iptables package (http://www.netfilter.org/) and the iproute2 package (http://www.linuxfoundation.org/collaborate/workgroups/networking/iproute2).

When an application instance associated with a restricted domain requests network access, the request is processed by the OS and eventually reaches the iptables firewall module. This module, in addition to other processing, can mark a packet based on the identity of the process that sent it. For example, Netfilter, the kernel side of iptables, can match packets and connections to processes/users (using the OWNER module), and it can mark packets (the MARK module) or connections (the CONNMARK) module. It can later act upon those marks when making filtering decisions, and the routing subsystem can act upon them when making routing decisions.

After iptables has finished processing the packet, the packet is further processed by the OS and is sent to the iproute2 module which determines routing for the packet. Based on the packet marking from iptables and the destination IP address, the iproute2 module determines which network interface is used to handle the packet. A first network interface is provided by the OS and sends information without encrypting it. A second network interface may be a tunneling interface, which encrypts the packet data and then sends it though the OS interface to a counterpart interface for decryption and further processing.

6.3.4.3 Service Manager Attachment

In those embodiments using the service manager attachment method, when an application requests a pointer to a service from the secured service manager service, that service identifies the application domain, and provides a pointer to the appropriate domain network service. When the application accesses the domain network service. That service can encrypt and decrypt messages and determine their routing based on the policy requirements of the domain.

In the case of domains when network connections to external services are mediated, the domain network service can modify the destinations of requests to reference a VPN gateway within the domain owner's private network. Network requests to destinations other than the VPN gateway may be modified to request the VPN gateway, or may be blocked. This ensures that restricted domain applications can only use network access to connect to the domain owner's private network.

Alternatively, it is possible to configure a domain network service to allow access only to a white list of destinations, or to block access to a blacklist of destinations.

6.3.5 Loader Application Method

Some embodiments of the invention include use of a type of distributable policy enforcement point referred to herein as a "Loader" application. By use of a "Loader" application, a target application can be executed in a policy-compliant manner without any requirement for modification of the device OS, replacement of system services, or other methods that can typically require elevated privileges. The loader application method involves creation of a "Loader" application that upon execution with typical user permissions establishes a controlled environment into which it can load a target application and execute the target application with mediation of all target application external access, such as file system, network, and IPC, as required to enforce domain policy for the target application.

The specifics of how a Loader application establishes a controlled environment will vary with the design of the OS of the device it is to operate on. For example, on an iOS (e.g. Apple iPhone or iPad) device, this can involve use of a library interception technique that uses modification of the in-memory vector table for selected functions of the libc, and/or other libraries to redirect library function calls to Loader application functions that mediate the requested operations according to policy, and optionally pass the arguments to the library functions that were replaced, when that is allowed by policy. The target application is then loaded into process memory and an entry point called to start its execution. Attempts by the target application code to perform operations such as accessing files, opening network connections, or communicating with other processes are redirected through Loader application functions, which allow, block, or modify them according to policy.

On devices using other OSs, such as Android, different or additional methods for establishing a controlled environment for target application code to execute in may be employed. For example, Android applications are typically written in the Java language, and executed in a language virtual machine called Dalvik. Java is an object/class-oriented language, and the Dalvik virtual machine interprets the byte code that Java programs are compiled into. Android (or similar) applications also can make use of "native" code, through a mechanism referred to as the "Java Native Interface" (JNI). JNI permits use of code written in other languages, such as C or C++, to be called from Java code. This is sometimes used to create function libraries or to implement code better written in such other languages.

Establishing a controlled environment for a target application, using the Loader application method, on an Android (or similar) machine, involves two main Java techniques, the proxy class technique and the inheritance technique, as well as use of the library interception technique for Android's libc-equivalent, which is called "Bionic," and optionally other libraries.

Use of one or both of the Java techniques in combination with the library interception technique results in the Loader application's being enabled to mediate attempts by the target application to access resources outside of the process (e.g. file system, network connections, IPC, system services, device hardware, etc.), whether from the target application's Java or native code, or any supporting classes or libraries it might make use of, that use system Java classes or library calls for external resource access. Any such attempts are redirected to Loader application code, which mediates them according to policy. Target applications require no explicit support in their design to enable use of these techniques, and no modifications to the target application code are required.

Because they are ultimately processed by a target application, such as a browser or special purpose application with browser-like capabilities, that can be restricted to comply with domain policy, the Loader application method also can mediate web applications, such as those based on HTML, Javascript, Java web "applets", AJAX, or other such technologies. The supporting application's access both to locally stored data as well as network-accessed data, or even to the web applications themselves, can be mediated by the methods and techniques described herein so as to ensure compliance with domain policy.

Mediation can comprise blocking access, permitting access, or modifying access. Modifying access can comprise for example and without limitation, redirecting file access to different storage locations, encrypting data as it is stored or transmitted, decrypting data as it is read or received, redirecting network connections through a VPN, limiting destination addresses or URIs for network connections or redirecting them to alternate locations, translating data formats during import or export, protocol conversion or tunneling (e.g. converting an FTP file fetch into an HTTP get request, or sending SMTP mail through an SSH tunnel), converting data from one form to another (e.g. converting text output to spoken audio output, accepting spoken inputs and converting to text or commands. or converting spoken input in English to stored audio files in French), and/or logging accesses to an audit or debug local log file or networked logging system.

A typical Loader application will make use of both proxy class and inheritance techniques in addition to the library interception technique, though it is possible for a Loader application to be created using only the proxy class and library interception techniques. While described for the Android OS, similar methods can be used for any OS having an essentially similar design.

6.3.5.1 Android OS Application Execution Overview

In those embodiments including an Android (or similar) OS, upon booting, the Android OS performs startup tasks similar to any Linux-derived OS variant. It loads a kernel, loads device drivers, and starts daemon processes. In some embodiments, one daemon process is the "zygote" process that starts an instance of the Dalvik VM, which loads the zygote process's application that listens on a socket for request messages. Such processes and their operation will be familiar to those having ordinary skill in the art.

One message type that zygote responds to requests that an application be started. The zygote process forks to create a process to run the application in, changes UID and GID numbers to match those of the application to be loaded, then loads the application code and tells the framework code running in the same process to start interacting with the system ActivityManager. The ActivityManager communicates with the application process via an IPC method called "Binder" and tells it to create Activities, Services, etc. as needed. The application process then uses the application manifest to determine what classes to load to start the application or respond to the requests from the ActivityManager. Once the application's initially loaded classes have control, they carry out the application's functions, and the system classloader, or custom classloaders registered by the application code, handle loading of any additional classes required by the application.

The zygote process method is used by Android to start a number of system processes, such as a "system_server" process that starts other services, such as the ActivityManager service, and then the first app, the "home" app that establishes the "home screen" for the user. The home screen is used by the OS to display information to the user, and by the user to request running of other applications. The zygote process is used again to start user applications as requested when these are not already running.

6.3.5.2 Loader Application Proxy Class Technique

Other embodiments include use of the loader application proxy class technique. The Loader Application Proxy Class technique involves creation of an application that has classes that duplicate the methods of the classes used in the target application that must be replaced in order to mediate target application access outside of the process it is running in. Such methods are illustrated in FIGS. 4 and 5, and will be familiar to those having ordinary skill in the art.

Figure 4:
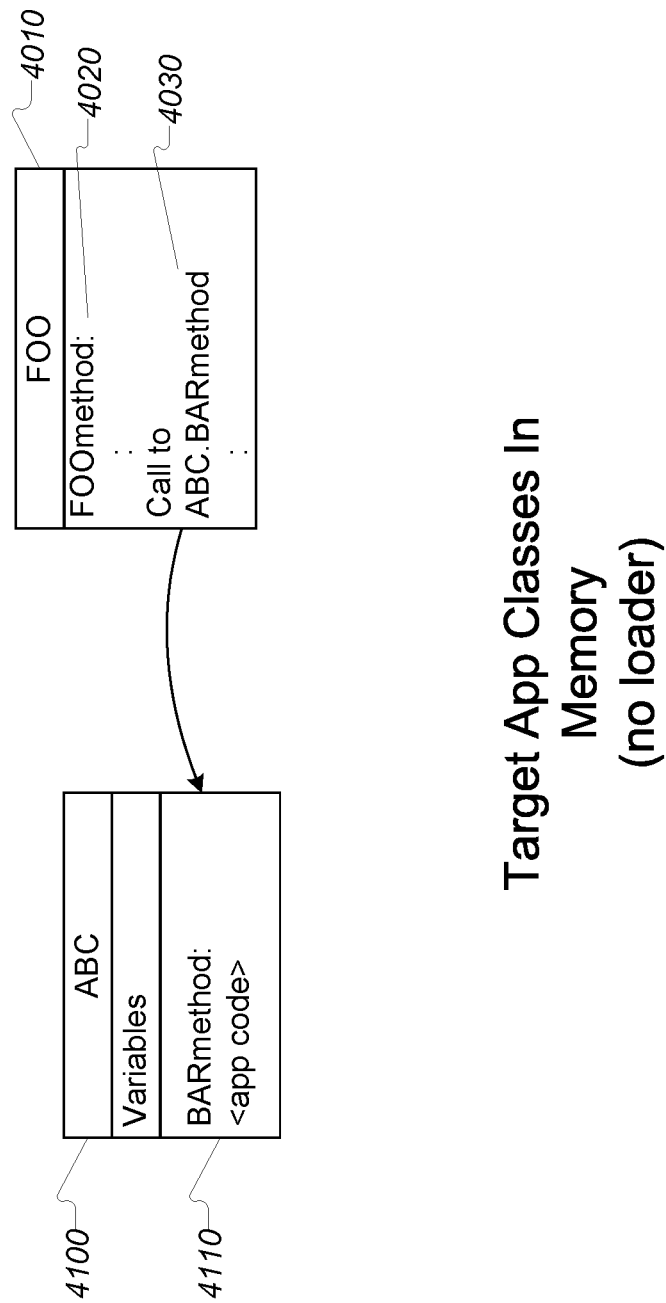
FIG. 4 depicts a class diagram showing a typical method invocation in accordance with the present invention.

FIG. 4 shows a typical relationship between two objects, one of class "FOO" (4010), which has a method "FOOmethod" (4020), that calls (4030) the "BARmethod" (4110) of the second object, which is of class "ABC" (4100).

Figure 5:
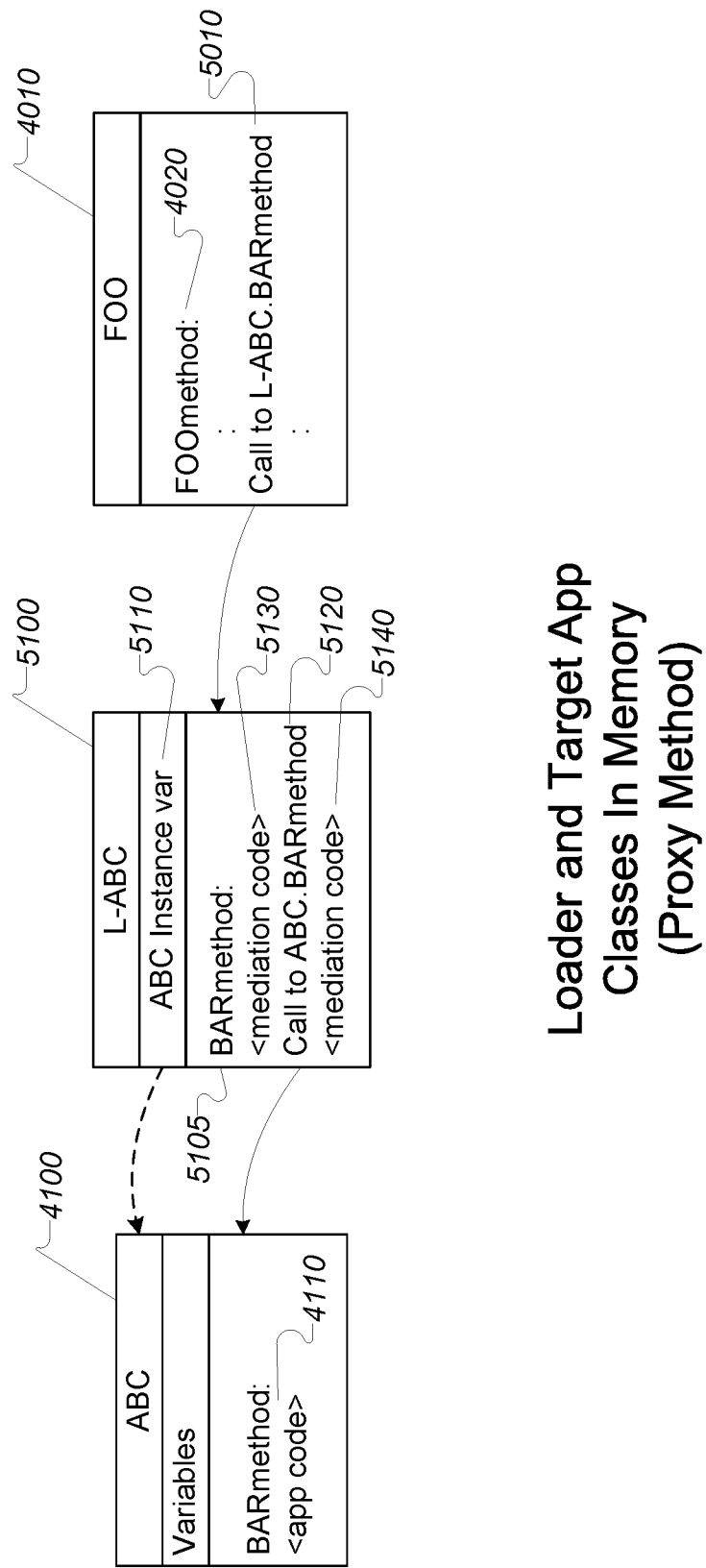
FIG. 5 depicts a class diagram showing a target app class method invocation when using the proxy class method in accordance with the present invention.

FIG. 5 shows how this relationship is altered in the proxy class technique to permit interception and mediation of the call to ABC.BARmethod (4110). A third object, of class L-ABC (5100), is added which has the same functionality in terms of methods supported (i.e. a "BARmethod" (5105) as ABC (4100) class objects do. L-ABC (5100) also has an instance variable (5110) that is an instance of the ABC class. Calls (5010) to ABC.BARmethod (4110) are redirected to calls to L-ABC.BARmethod (5105) wherever they occur, such as in the FOO object's FOOmethod (4020). If the ABC.BARmethod is declared in an interface for the ABC class, the Java reflection proxy capability can be used to accomplish the redirection of method calls to an invocation handler L-ABC.BARmethod (5105).

When FOOmethod (4020) executes a call to L-ABC-.BARmethod (5105), L-ABC.BARmethod (5105) can use pre-call mediation code (5130) to determine whether to permit the call to occur, and if so, whether the parameters must be adjusted to comply with policy. If the call is blocked, L-ABC.BARmethod (5105) can return an error result, an innocuous result, signal an error handler, or other action as deemed appropriate by those with skill in the art. If the call is not blocked, L-ABC.BARmethod (5105) calls (5120) ABC.BARmethod (4110) using the instance variable ABC object (5110). When ABC.BARmethod (4110) returns, any result can be mediated by post call mediation code (5140) in L-ABC.BARmethod (5105). Results can be modified, replaced, or suppressed as required by policy. In some cases L-ABC.BARmethod (5105) can even return an error result or otherwise indicate failure to FOO.FOOmethod (4020), whether or not ABC.BARmethod (4110) returned such a result. Alternatively, L-ABC.BARmethod (5105) can simply not call ABC.BARmethod (4110) and replace the call with different functionality.

In a Loader application that is using the Loader Application Proxy Class technique, the proxy class technique is used to replace various system classes, such as Application, Activity, Server, and Provider classes, with proxies. The proxy classes intercept calls to the methods of these system classes, and mediate them as required. Android application code uses these classes, or sub-classes of them, and the classes and methods these invoke in their methods, to perform the kinds of activities that policy can require mediation of (e.g. local file access, network communication, IPC, etc.). By replacing the system classes with Loader application classes, the Loader application can interpose its methods between the target application calls, and the system class methods the target application is calling.

The Loader application itself is loaded by the default classloaders of the Dalvik VM, and once started it instantiates a classloader to use for loading the target application classes. This is necessary for loading the target application, because the target application classes are not part of the Loader application, and may not even be installed on the device (e.g. the target application may be located on a network server, on removable media, as a resource of the Loader application, etc.), and the default classloaders of the Dalvik VM may not be able to load the target application classes.

To ensure that the Loader application gets to establish intercepts for system calls and system services early in the application load process, these are established by a special Loader application provider class (referred to herein as "InitProvider"). Provider classes are normally loaded first when loading an application in Android. The InitProvider class used to declare the classloader for the target application is not a proxy class for any class in the target application, but is a special Loader application provider class that is loaded with a high priority so it gains control early in the application load process. In some cases, such as when a shared process is involved, the InitProvider class may not be loaded before the Loader Application's main Application class (referred to herein as "LoaderApplication"), so the LoaderApplication class also attempts to establish intercepts for system calls and system services as required.

6.3.5.3 Loader Application Inheritance Technique

In other embodiments, the loader application inheritance technique is used. As will be apparent to those having ordinary skill in the art, the loader application inheritance technique is similar to the loader application proxy class technique in that there are Loader application classes in the Loader application corresponding to target application classes that have methods requiring mediation, but in the inheritance technique the classes are sub-classes of the target application classes rather than separate classes that re-declare all methods of the class they proxy and which have an instance variable of the class they proxy as described above. The advantage of the inheritance technique is that the Loader application's classes only have to declare methods for the target application classes' methods that must be mediated. Any target application class methods that don't require mediation can be omitted from the Loader's sub-classes as they will be handled by the superclasses (i.e. the target application's classes). This reduces the amount of code in the Loader's classes and therefore the memory space needed to support them when they are running. Most mobile devices are limited in the amount of memory they support for space, cost, and power reasons, so reducing the memory needed for each application is highly desirable. Having fewer over-ridden methods also reduces the sensitivity to changes in the target application's class definitions (or of the system classes they are sub-classed from). Unless the target application or system class definitions are altered in one of the mediated methods, or a new method requiring mediation is added, the Loader application does not need to be changed. This reduces maintenance effort and costs over those of the proxy method.

Because the Loader application has sub-classes of classes that are part of the target application, and the default Java classloaders do not permit sub-classing across applications like this, the Loader application must establish a custom classloader for loading target application classes, and this custom classloader must be high enough in the classloader hierarchy to be called for loading all target application classes as well as the classes they depend on. This is accomplished by manipulating the classloader hierarchy to properly position the custom classloader prior to loading any target application classes or Loader application sub-classes of them. For example, if the target application has an Activity class called "a.b.c," the Loader application will, for example, have a subclass called "Loader.a.b.c" whose super-class is "a.b.c." When the system needs to create an instance of "Loader.a.b.c" it would normally try to load it with the Loader application package's default classloader, but the Loader application's default classloader (and its parent classloaders) don't have any information about class "a.b.c" (it is in a different package, with its own classloader) so loading of class Loader.a.b.c would fail. By creating a custom classloader that has access to the target application's code (and therefore has the ability to load class "a.b.c") and making it the parent of the Loader application package's default classloader, it becomes possible for the Loader application package's classloader to load class "a.b.c" (classloaders generally call their parent to load classes, and only load classes themselves if the parent fails to load the requested class) and therefore possible to load "Loader.a.b.c."

Establishing the custom classloader at the proper point in the classloader hierarchy is done in exemplary embodiments by the InitProvider class, which can be loaded by the default classloaders because it is not sub-classed to any target application classes. As with the proxy class technique, in some cases the InitProvider class is not instantiated prior to the LoaderApplication class, so the LoaderApplication class must be able to establish the custom classloader, and may not be sub-classed from a target application class. The LoaderApplication class is therefore typically implemented using the proxy class technique, even when the remainder of the Loader application is implemented using the inheritance technique.

Those having ordinary skill in the art will appreciate that a complication arises in classes where methods that must be overridden in the Loader application's sub-classes are marked "final" in the system or target application classes; this prevents sub-classes from overriding them, as is necessary in the Loader application classes. To deal with this problem, the class definitions in the VM are modified to remove the "final" marker, and permit sub-classing of these classes. This can be accomplished by use of an "un-final" function written in "native" (JNI) code.

Figure 6:
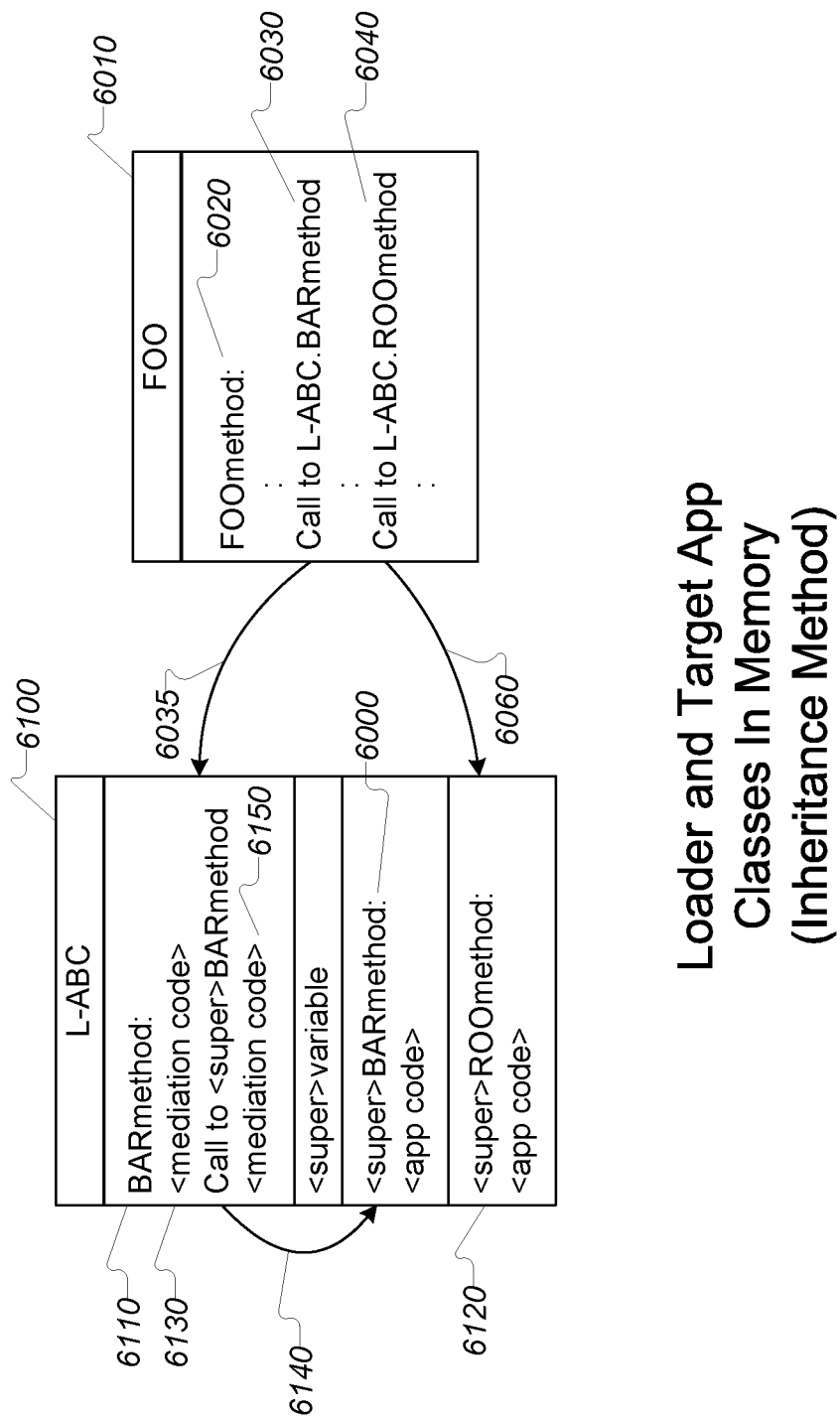
FIG. 6 depicts a class diagram showing target app class method invocations when using the inheritance method in accordance with the present invention.

FIG. 6 shows an example of how the class relationships are altered in the inheritance technique to permit interception and mediation of method invocations. These details will be understood by those having ordinary skill in the art. An object of class FOO (6010) has a method, FOOmethod (6020) that calls two methods of class ABC (not shown). An object of a Loader application class, L-ABC (6100), has been instantiated. It is a sub-class of class ABC, and therefore inherits class ABC's instance variables and methods. Class L-ABC (6100) overrides class ABC's BARmethod (6110), but does not override class ABC's ROOmethod (6120). Class ABC is not instantiated; only class L-ABC is instantiated. Class FOO has been modified so that references to class ABC are directed to class L-ABC instead (6030, 6040). Because class L-ABC is a sub-class of class ABC, it is capable of being referenced as either type. This results in class FOO's calls to ABC class methods (6035, 6060) being handled as calls to class L-ABC methods (6110, 6120), whether overridden or inherited.

When class FOO's FOOmethod calls L-ABC.BARmethod (6035), the overridden L-ABC.BARmethod (6110) is invoked. It performs any required mediation (6130), and if appropriate, can call on the original ABC.BARmethod code through the superclass mechanism of Java (6140). If additional mediation is required after such a call, L-ABC.BARmethod can perform it (6150) before returning to the caller in FOO.FOOmethod (6030).

When class FOO's FOOmethod calls L-ABC.ROOmethod (6060), the code invoked is the superclass method of class ABC (6120), because this method was not overridden by class L-ABC (6100).

As will be appreciated by those having ordinary skill in the art, in at least some embodiments the only Loader application class that can't use the inheritance method is the Loader's version of the target application's Application class. In some cases, such as when the InitProvider class isn't loaded first as previously described, the LoaderApplication class may be loaded first, at a time prior to the Loader application's classloader being initialized. To resolve this, the LoaderApplication class can be implemented using the proxy class technique.

6.3.5.4 Domain Namespaces

In some embodiments, as will be familiar to those having ordinary skill in the art, applications can request functions from each other, such as on an Android OS device, data requests to providers, view requests to activities, etc., by passing messages through the Binder mechanism. Data, such as requests represented as "intents", is created, and passed to an application that can handle the request. In the case of intents, intent filters included as part of each application manifest are used to determine which application is capable of handling the requested function. For example, if an intent's action is "VIEW," then only applications that have an intent filter matching an action of "VIEW" will be chosen to handle the request.

Likewise, permissions are specified in application manifests using names that must match between a requesting application, which must be granted a permission, and the application receiving a request, which requires the permission. For example, if a calendar provider requires that a requesting application possess a "READ-CALENDAR" permission before it can request calendar data, an application making a request for calendar data without the "READ-CALENDAR" permission granted to it will fail to obtain the calendar data from the calendar provider.

In some embodiments a Loader application makes alterations to the strings used for these and similar functions, such as by pre-pending a domain name or other characters, appending an encrypted piece of text (such as the function being requested), hashing the string, or some other method, as the request is being sent from the requesting application process, and reversing the alteration as the request is being received into a destination process, to create thereby a domain namespace that prevents applications that are not in the domain from handling or making requests from or to applications that are in the domain. By making the alterations and undoing the alterations in the Loader application code, target application code is not affected, and continues to send and receive requests as would be done outside of any domain.

For example, in an exemplary embodiment, if an application sends a "VIEW" action in an intent, the Loader application code will intercept the request and alter the action by pre-pending text to the action, making it "DOMAIN-X-VIEW" (where the string pre-pended can be specified by domain policy, specified or computed according to the design of the Loader application code, or a combination of these or other methods). The request is then sent on to the system for dispatching to a compatible application. The system looks at the available intent filters to determine the application to pass the request to. Non-domain applications, or applications that are in other domains, will not have specified intent filters with "DOMAIN-X-" pre-pended to the actions, and will not be chosen. An application that is in the domain and that can handle a "VIEW" request, will have had its Loader application's manifest built with an intent filter specifying that "DOMAIN-X-VIEW" is an action it can handle, and so it can be chosen by the system to handle the request. When the request is given to the receiving application, its Loader application will strip off the "DOMAIN-X-" portion of the action, leaving only "VIEW" as the request is passed to the receiving target application, which then handles the request.

In some embodiments, when dealing with permissions, a similar method is used, though the pre-pending or other alteration of permission names can be done when the Loader application manifest is created in at least some cases, rather than at run-time as with the previous intent action example. For example, in an exemplary embodiment, a provider that is designed to require a "CALENDAR-READ" permission be assigned to a requestor before it will pass calendar data, is loaded by a Loader application that requires a "DOMAIN-X-CALENDAR-READ" permission. If an application with "CALENDAR-READ" permission requests calendar data from the domain application, it will not be granted, because the required permission (DOMAIN-X-CALENDAR-READ) does not match the permission granted (CALENDAR-READ). If the requesting application is in the DOMAIN-X domain however, the Loader application of the requesting application will have modified the permission to "DOMAIN-X-CALENDAR-READ," and the permission required and the permission granted will match and the request will be passed through the permission check.

As will be appreciated by those having ordinary skill in the art, the namespace alterations as described herein do not have to be applied in all cases. For example, if policy for a domain permits making requests of some or all non-domain applications, or handling requests from some or all non-domain applications, the Loader application code can refrain from making alterations to the actions, permissions, or other request data in making or handling requests to or from those non-domain applications. For example, if policy for a domain permits domain applications to take pictures using a device's camera using the standard, non-domain camera application, the Loader applications for the domain can implement that policy by not altering requests that involve taking such pictures, which will result in the system handing the requests to the non-domain camera application. The Loader application comprises a manifest containing any required permission or intent filters required for the operation however, instead of, or in addition to any domain-specific permissions or intent filters. Alternatively, the Loader application may load aspects of the manifest directly from an external source, or may construct and load the manifest in response to a received policy. For example, a dual stage loader may be created, which first loads a policy, then loads and modifies an application and/or its manifest in accordance with the policy. Other requests, such as calendar data read requests, may still be altered to ensure that calendar data is shared only with applications within the domain, depending on the domain policy requirements.

By use of such namespace methods, applications within a given domain can interact with each other, while being isolated to the extent required from other applications on a device.

6.3.5.5 Loader Application Creation

Creation of a Loader application occurs in two parts: extraction of information about the target application and generation of the Loader application. Creation of a Loader application also can, in at least some exemplary embodiments, involve access to and provision of domain policy. For example, when a default policy is to be provided as part of a Loader application package. Such operations can be implemented using techniques familiar to those having ordinary skill in the art.

6.3.5.5.1 Metadata Extractor

In some embodiments, the extraction step occurs on the device that will host the Loader application, or be done on another system, such as a server. The main requirement is that the extraction code has access to the target application's manifest. For example, on an Android device, an application's manifest is in a file that is installed with the application ("AndroidManifest.xml"). The extractor processes the manifest file, and recursively processes any other xml resources referenced by the manifest file.

The Extractor dereferences any strings or other objects referenced in the collected xml data which constitutes the target app's metadata. It then outputs the processed metadata in a form usable by the Loader application generator. The processed metadata includes the names and types of all target application classes that require mediation. The processed metadata has sufficient information to permit generating the Loader application, whether on the device or on a separate system, such as a networked server, without additional information about the device or the target application. In particular, the processed metadata does not contain any functional code of the target application.

6.3.5.5.2 Loader Application Generator

In some exemplary embodiments, the Loader Application Generator is operated on the device that is to host the Loader application, or on another device, such as a networked server, in other exemplary embodiments. In yet other embodiments, the Loader Application Generator and the Extractor are run on the same system, or on different systems, so long as the Loader Application Generator has access to the target application metadata produced by the Extractor. Still other exemplary embodiments can permit and enable Loader Application Generators to be operated either on the device that is to host the Loader application, or on another device, as determined by preference, policy, configuration, or other factors.

In some exemplary embodiments, the Loader Application Generator uses the processed metadata output of the Extractor, and combines it with a template loader application. In some exemplary embodiments the Loader Application Generator also can make use of domain policy, to control how a Loader application is generated, to include policy in the generated Loader application, or both. The template loader application is typically in the form of Java bytecode, but also can be provided in Java source code form, a compiled language such as C++, in XML format, or in any combination of these or other forms as determined to be useful by those with skill in the art. The template has declarations for each class that must be mediated, as well as some additional classes used by the Loader application's other functionality (e.g. classes for processing policy, communicating with policy enforcement points and/or policy management points, custom classloaders, or for establishing the required process environment for the target application). The output of the Loader Application Generator is a Loader application for the target application. The Loader application then can be installed on a device and used to operate the target application on that device under policy requirements.

Using the metadata output by the Extractor, the Loader Application Generator goes through the list of classes (e.g. Activities, Services, Providers, Receivers, etc.) of the target application. For each class in the list, a copy of the appropriate class from the loader template is added to the Loader application being created. If using the inheritance technique, the bytecode of each copied class is altered to reflect a superclass that is defined in the target application. If using the proxy technique, the bytecode of each copied class is altered to include the name of the class that it will load from the target application that is to be proxied. Each class copy added to the Loader application is given a unique name.

For non-class components declared in the target application's manifest, such as permissions, intent filters, and other metadata, the Loader Application Generator determines whether to put them in the Loader application's namespace by modifying their names, or to leave them with their original names. For example, in a given implementation, if the target application metadata contains a request for permission to use the "contacts" provider, the permission request is modified to request permission to use the domain's "contacts" provider instead, but if the target application metadata contains a request for a permission to access the "location" provider (i.e. GPS) the original permission is not modified. The decision as to which components to modify and which to leave as they were in the target application can be dependent on policy requirements, system capabilities, or both (e.g. if there is no "location" provider for the domain, requests for one will not be modified, or will be removed to block access, as required by policy). The same is true for intent filters; if the target application registers a filter for an event that is generated by another component within the domain, the Loader Application Generator can alter it to put it in the domain's namespace by pre-pending a string to the filter name, but if the intent filter is involved with handling a system event (e.g. it is an authenticator that the AccountManager is going to send queries too, and there is no domain-specific AccountManager), the intent filter is left intact. This processing is done for each of the names of each of the non-class components listed in the processed metadata provided by the Extractor.

Other required Loader application classes, as described above, are added to the Loader application. In some exemplary embodiments, the specific "other classes" that are required for a given Loader application will depend, at least in part, on the content of the target application metadata provided by the Extractor. For example, if a given target application makes no use of networking, then Loader application classes that support mediation of networking are not required. In some exemplary embodiments, policy requirements also can determine which other required Loader application classes are included. For example, if policy requires that target application data be stored in an encrypted form, classes useful for dealing with storage and access to encrypted data can be added to the Loader application.

In addition to other required Loader application classes, the Loader application will also require resources that are not part of the target application, but which are required for proper functioning of the Loader application. For example, the name of the target application to be loaded, or the URI where the target application can be found. In some exemplary implementations, Loader application resources can include the target application itself. Loader application resources also can include icons, a default policy for initial use prior to receiving current policy updates, localization text files, help files, and other resources that the Loader application requires for proper interaction with the system and/or the device user. In some exemplary embodiments, policy requirements also can determine which Loader application resources are included. For example, if policy requires that applications in a domain that perform network communications do so using encrypted data, libraries with encryption/decryption support functions can be included in the Loader application resources.

When complete, the Loader application is built into an installable application package, capable of being installed in the same way as any typical application. In some exemplary embodiments, the Loader application is signed as may be required by a device application installer or an application "store," and placed with a policy distribution point, application "store," application repository, or otherwise made available for distribution and installation on devices requiring it and permitted to host it.

6.3.5.6 Example Loader Application Execution

In some embodiments, the Loader application is used to load and run a target application in a policy-mediated manner by creating a process environment in which the target application can execute and where all attempts to access external resources (e.g. files, device components, networks, IPC with other processes, etc.) are mediated according to the policy for the domain the Loader application belongs to.

When started via one of its entry points, such as the InitProvider or LoaderApplication, the Loader application queries a policy management point for the current domain policy, and to determine whether the domain is currently active on the device. In some exemplary embodiments, the device user is required to specify a password or otherwise authenticate to a policy enforcement or management point of the domain before domain applications are permitted to execute on the device.

If the domain is not currently active on the device, a policy management point is notified by the Loader application so that it can interact with the device user to activate the domain or take other actions required by domain policy (e.g. invoke a login screen, report a violation, etc). The Loader application then exits without loading or starting the target application.

If the domain is currently active, and domain policy permits starting the target application under the existing circumstances (e.g. at the current device location, with the current device connectivity, with the currently running applications, etc.), the Loader application begins configuring the process for target application loading. Steps required for process configuration include getting any required encryption keys (e.g. for storage access, authentication, or connection security), acquiring current domain policy for the target application, and any other information needed from one or more policy management points that is required. The Loader application will also request optional external code from a policy management point to extend the Loader application's installed code with additional helper classes, JNI or other code, function libraries, policy implementation objects, updated packages, etc.

Once the Loader application has updated policy, code, and other process configuration information and software requirements, the next step is to set up to intercept various system calls and the communication channels with various system services. The Loader application sets up these interceptions using two primary methods. The first involves use of low level native code that intercepts syscalls, Dalvik functions, and various framework library functions. The second is Java-based reflection classes code that deals with interception at a higher level.

To intercept syscalls, Dalvik functions and framework interactions, the Loader application modifies the Global Offset Tables (GOTs) that are used to dynamically link libraries so that their functions are accessible to other code, such as applications and other libraries. As libraries are loaded into a process, and the memory addresses of the functions they contain are determined, the GOT for the library is filled in with the addresses associated with the symbolic names of the functions. When other code (e.g. application, other libraries, etc.) is loaded that references the symbolic names, the GOT is searched to determine the actual addresses, and the other code's GOT is filled in with this information, linking the other code to the function in the library that was previously loaded. The GOTs are collected into a linked list. By determining the memory location of a GOT for a library loaded early in the process (for example, "bionic" on an Android system, or "libc" on an iOS system), and following the linked list of GOTs, the pointers to the library functions can be located, and by replacing these with pointers to Loader application functions, the library function calls can be redirected for mediation by the Loader application. Because target application code typically uses library functions to initiate system calls, redirecting the library function calls permits mediation of system calls made by the target application. While it is possible to create a target application that deliberately bypasses library functions and makes system calls directly using interrupts in order to avoid being mediated, such an application can be dealt with through policy, by not permitting the application to participate in a domain.

In some embodiments, to intercept interactions with system services, the Loader application creates reflection proxies. The Java reflection proxy capability results in Loader application functions being called to handle method invocations of reflection proxy class methods. Reflection proxies can be used to redirect method invocations for any object that implements an interface, which includes system services.

As will be appreciated by those having ordinary skill in the art, use of reflection proxies as well as library function call intercepts can result in Loader application code being invoked twice for a given target application request: once in the reflection proxy class, and once when the library function is called. Aspects of policy mediation can be done in either, or both, places. For example, if an intent object is being passed as an argument to a request, the reflection proxy class invocation handler can deal with alteration of the intent very easily, as the intent is a Java object. If the alteration was done at the library intercept level, where the intent is represented as a Parcel (a serialized data object in an Android-defined format), alterations are more difficult. In some exemplary embodiments, such alterations are preferably done at the higher level, in the reflection proxy invocation handler, and the lower level library function code is used to verify that the changes were done properly before dispatching to the syscall itself.

In some cases the request interceptions are done in support of the Loader application's policy mediation needs, and in other cases they are done to permit the Loader application to adjust interactions between the target application and the system or other application so as to make the Loader application's presence invisible to the target application. For example, if the Loader application creates a subclass of target application class "a.b.c" called "Loader.a.b.c", and the target application's code calls "this.getClass( ).getName( )", it expects to get "a.b.c" as a result, not "Loader.a.b.c". Not returning the expected value might interfere with some check that the application code is running on itself. At a higher level, if the target application interfaces with the Android system package manager and asks for its own name, it should receive the target application's name, not the Loader application's name. If the target application tries to access a resource, it needs to see the resource from its own package with its own environment, and not that of the Loader application. By intercepting the calls that the target application uses to acquire this information, the Loader application is enabled to substitute the values the target application expects for those actually returned by the various system calls and system services.

The next step in running the target application in the mediated process environment is to create a classloader that is useful for loading target application classes from the target application's installed or stored location. The target application can be located anywhere that the Loader application has access to, that is consistent with domain policy. Depending on the restrictions imposed by the OS and domain policy, this can be an installed application on the device, in Loader application local storage, in device shared storage, on removable media, on a network server, on another mobile device, in the Loader application's installed package resources, or any other accessible and allowed-by-domain-policy location.

If the Loader application is using the inheritance technique, the Loader application next manipulates the classloader hierarchy so that the Loader application's target application classloader can load superclasses of the Loader application's classes from the target application (the default Android classloaders cannot do this). If the Loader application is using the proxy technique, this step is not needed and the normal classloader hierarchy is acceptable.

The Loader application then installs a command-receiver object that is able to receive commands from policy management points requesting that it perform actions such as "exit", "wipe data", "update domain policy", "run external code extensions", "perform backup/restore of app's private data", etc.

The Loader application then loads and instantiates target application providers using the Loader application's target application classloader, while mediating interactions between the system and the target application.

The Loader then loads and instantiates the target application's Application class instance, if it has one, then waits for the system to provide requests through the normal Android message path to tell the target application what to do (e.g. to start an activity via an intent, to serve a query via a provider, etc). For each system interaction, the Loader application's proxy or sub-class checks whether the domain is still active, and exits if it is not. If the domain is still active, a check is made to see of the domain is locked (e.g. a domain screen lock has been activated). If the domain is active but locked, the Loader application requests that a policy management point cause an interaction with the user to request unlocking the domain. The Loader application does not permit the requested system interaction to proceed until the domain is unlocked. If the domain was not locked, or after it has been unlocked, the requested interaction is mediated according to domain policy, as described herein, and if the policy allows it, the Loader application class invokes the superclass's (or proxied object's) corresponding method so the target application functionality can execute. The target application's code is run in a policy-controlled manner due to the previously established system and system service call intercepts that route the calls to the Loader application's helper classes for mediation.

6.4 Policy

As described above and in greater detail hereinbelow, in some embodiments a policy for a domain controls the system's response to one or more operations requested by an application. In other embodiments, policy can be used to implement or control data security, data distribution or sharing, data integrity, application configuration, application use, user access, and/or other aspects of data or device use. A policy is not required to specify mediation be done for all operations that can be requested by an application in all embodiments. For example and not limitation, in some embodiments, policies specify mediation only for those operations that require mediation. In a particular example, a request for access to current local time data will not generally require mediation, but a request to open a data file for reading generally will require mediation.

In some embodiments, policies for a domain are specified by the owners of the data associated with the domain. In some cases this will be the device user, in other cases it may be the device owner, and in yet other cases it can be another independent entity, such as an enterprise Information Technology (IT) department. In some exemplary embodiments, applications and data can exist on a device without being associated with a domain. There is typically no mediation of requests for such "ownerless" applications and data.

6.4.1 Policy Flow

In some exemplary embodiments, policy is supplied by a policy source (FIG. 1, 1200), such as a Policy Distribution Point (e.g. a policy server, a file server with a policy rule file, etc.). In a first exemplary embodiment, policies are loaded to the device when a request mediation module on the device (such as a Policy Management Point) connects to the policy source to obtain a policy to implement. Alternatively, a policy may be loaded to a local policy cache on a device using a policy definition application comprising a Policy Distribution Point, or by copying the policy to the device using techniques well understood to the average device user.

A policy for a specific domain, domain/application, and/or domain/device combination may be set by the owning entity for the domain. An owning entity for the domain may be the owner of the device, the provider of an application and/or data, or a third party such as the device owner's employer's IT department.

In some embodiments, this policy can be modified by the data processing device's owner. In other embodiments, the policy may not be modified by a device owner and all changes must be done by the entity owning the domain.

Figure 7:
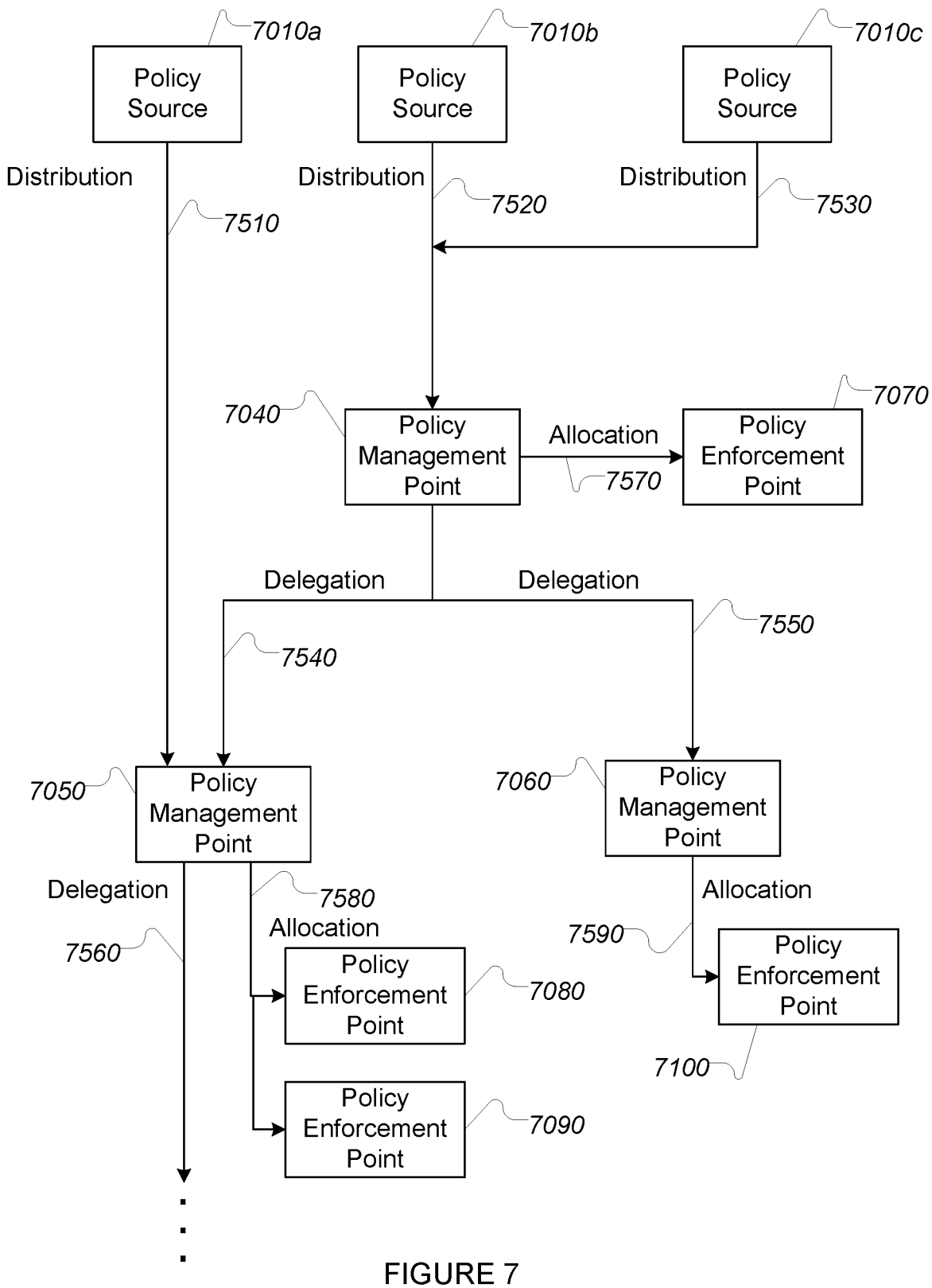
FIG. 7 depicts a schematic diagram of a multi-level policy distribution and enforcement arrangement, according to one embodiment of the invention.

In some exemplary embodiments, policy handling is accomplished by interaction among several types of policy handling components, each of which can be instantiated one or more times as required, on a device, on systems external to a device, or both to create a multi-level policy distribution and enforcement arrangement. FIG. 7 illustrates a schematic diagram of the major components of an exemplary multi-level policy distribution and enforcement arrangement.

Policy is distributed by one or more policy distribution points (7010*a*, 7010*b*, 7010*c*). Distribution can be done by pushing out policy periodically, or as policy is created or altered, or distribution can be performed by periodic polling of policy distribution points by components requiring policy.

In typical usage, policy is distributed from policy distribution points to one or more policy management points (7040 or 7050) that can aggregate policy from a plurality of policy distribution points and resolve conflicts between the aggregated policies. For example, policy management point 7040 aggregates and de-conflicts policies distributed (7520 & 7530) from policy distribution points 7010*b* and 7010*c*. An arbitrary number of policy distribution points may be utilized by a policy management point, and an arbitrary number of policy management points can be supported by a policy distribution point.

The policy management points either allocate one or more aspects of the aggregated policy to one or more policy enforcement points (7070, 7080, 7090, 7100) or delegate one or more aspects of the aggregated policy to other policy management points (7050 or 7060 or both). For example, policy management point 7040 allocates (7570) policy enforcement for at least some of the policy it has received to a policy enforcement point (7070), and delegates (7540, 7550) at least some of the policy it has received to policy management point 7050 and/or policy management point 7060.

Policy management points also can aggregate policy from a policy distribution point with policy that is delegated from another policy management point. For example, policy management point 7050 aggregates policy distributed (7510) from policy distribution point 7010*a* with policy delegated (7540) by policy management point 7040. The aggregated policy, regardless of the source it was received from, is then delegated (7560) to other policy management points (not shown) or allocated (7580) to policy enforcement points (7080, 7090). In some cases, aggregation is not required, for example in the case of policy management point 7060, which receives only delegated (7550) policy from policy management point 7040. Policy management point 7060 also demonstrates that further delegation of policy is not required in all cases as it only allocates policy (7590) to policy enforcement point 7100.

It is possible that aggregation and/or conflict resolution of policy can result in errors that cannot be dealt with by policy management points. For example, two policy distribution points can provide mutually exclusive policy elements where the conflict cannot be resolved using the methods employed by policy management points for policy conflict resolution; a policy can require additional policy elements from another policy distribution point that cannot be reached; or a policy distribution point can specify policy elements for a device that cannot be enforced on that device. In such cases, the policy management point employs an error handler to resolve the problem. Resolution can involve disabling all use of a domain until the policy issues are resolved by a change in policy, notification of the source of the problematic policy elements (e.g. a policy server, the policy management point that delegated the problematic policy elements, etc.), execution of a policy-specified action (e.g. display a message for the device user, send e-mail or SMS messages to specified addresses, etc.), or other methods as determined to be proper by those with skill in the art. Combinations of any or all of these methods also can be employed.

Policy enforcement points (7070, 7080, 7090, & 7100) enforce the policy they are allocated using various methods, such as by configuring device policy settings, setting virtual machine operating parameters, or encapsulating applications to enable moderation of their access to resources. Policy enforcement points (7070, 7080, 7090, & 7100) can be implemented in one or in a plurality of forms, depending on implementation design preferences or requirements. For example, in an exemplary embodiment, a single exemplary policy enforcement point implementation can enforce policy using all available methods, such as device policy settings, operating system controls, virtual machine operating parameters, and application encapsulation. Policy enforcement points may be installed as part of a device operating system, as part of a virtual machine's hypervisor, in a loadable module such as a DLL or shared library, as part of an application interpreter such as a Java Virtual Machine, as part of a program loader, or in other ways as will be apparent to those with skill in the art. The Loader application described above is one possible example of a policy enforcement point.

Instances of this single exemplary policy enforcement point implementation can be deployed wherever a policy enforcement point is required. In an alternative exemplary embodiment, a plurality of policy enforcement point types can be implemented, each specialized for a sub-set of policy enforcement point methods. The plurality of policy enforcement points may be utilized together to cooperatively enforce the policy, and can be intermixed in order to provide the most effective protections for the domain. For example, device policy and virtual machine operating parameter enforcement methods can be implemented in a first policy enforcement point design, while a second policy enforcement point design can implement application encapsulation, and each type is then deployed according to its capabilities and the requirements of policy enforcement. In yet another alternative exemplary implementation, both methods can be employed, where a first type of policy enforcement point capable of using all methods of policy enforcement are implemented along with other, more specialized, policy enforcement point types that each use only a subset of enforcement methods, and each type of policy enforcement point is instantiated according to policy requirements. For example, on devices where a plurality of policy enforcement point instances would be impossible or inefficient due to device or OS design, the first type of policy enforcement point can be instantiated, while on devices where a plurality of policy enforcement point instances is not problematic and only a subset of enforcement methods are required by policy, an appropriate selection of more specialized policy enforcement point types can be instantiated. The decision as to how to instantiate policy enforcement points can be specified in policy, or left for policy management points to determine based on such things as device capability, device status, or the requirements of policy. In such cases the decision as to how to instantiate policy enforcement points can be revised when policy, device status, or other factors change.

In some implementations, policy enforcement can be allocated in a distributed manner. For example, a policy may specify that all communications from a device be performed to a specified endpoint using encrypted communications. The policy elements making up this specification may be allocated to a VPN endpoint and router policy enforcement point at a corporate site, and to a specific domain's policy management point on a mobile device, which allocates policy elements to one or more policy enforcement points in the domain. In this way, the applications that are part of the domain on the mobile device have their communication to the VPN endpoint enforced by a policy enforcement point or points on the mobile device, while the traffic management and routing of the traffic at the VPN endpoint is handled in accordance with the elements of the policy allocated to the VPN endpoint and router policy management point.

In still other implementations, one or more elements of a policy may be allocated to a specific distributable policy enforcement point, where the policy enforcement point is subsequently distributed to a device and implements at least part of the policy enforcement for a domain.

Policy conflict resolution, allocation, and selective distribution can take place at any policy management point, so there is no need for device configuration to be known by a policy distribution point, and enforcement is done in the most efficient manner possible.

By separating policy management and policy enforcement, and implementing both in a multi-tiered arrangement as described herein, great flexibility is achieved. For example, policy enforcement points can be implemented by manufacturers of devices or OSs, and employed by policy management points provided by a third party security provider. Policy management points can allocate policy enforcement in different ways on different devices, so as to make best use of the resources available on each device, or to cope with different limitations on different devices, without requiring policy to be specified for each device at the policy distribution point(s), or requiring the policy administrator(s) to know the specifics of how policy will be enforced on each device. Furthermore, distributable policy enforcement points can be configured and downloaded to a device on an as-needed basis.

6.5 Application Classification

A data processing device can contain a plurality of applications. In a preferred embodiment there can be a plurality of domains for a given device. In a first exemplary embodiment, there are two domains: corporate (in an exemplary embodiment, restricted) and personal (e.g. unrestricted). Restricted domain applications require a high level of security for the data they work with, and define data and application segregation requirements. Unrestricted domain applications require less security, and more flexibility. The domain determination for an application is made by a request mediation module as described below.

There are two options for performing this application classification. The first is "late classification," where a request mediation module classifies applications just prior to execution. The second is "early classification," where a request mediation module classifies applications at the time they are installed on the device, with the possibility that they can be reclassified if a policy obtained from the policy source changes.

Figure 2:
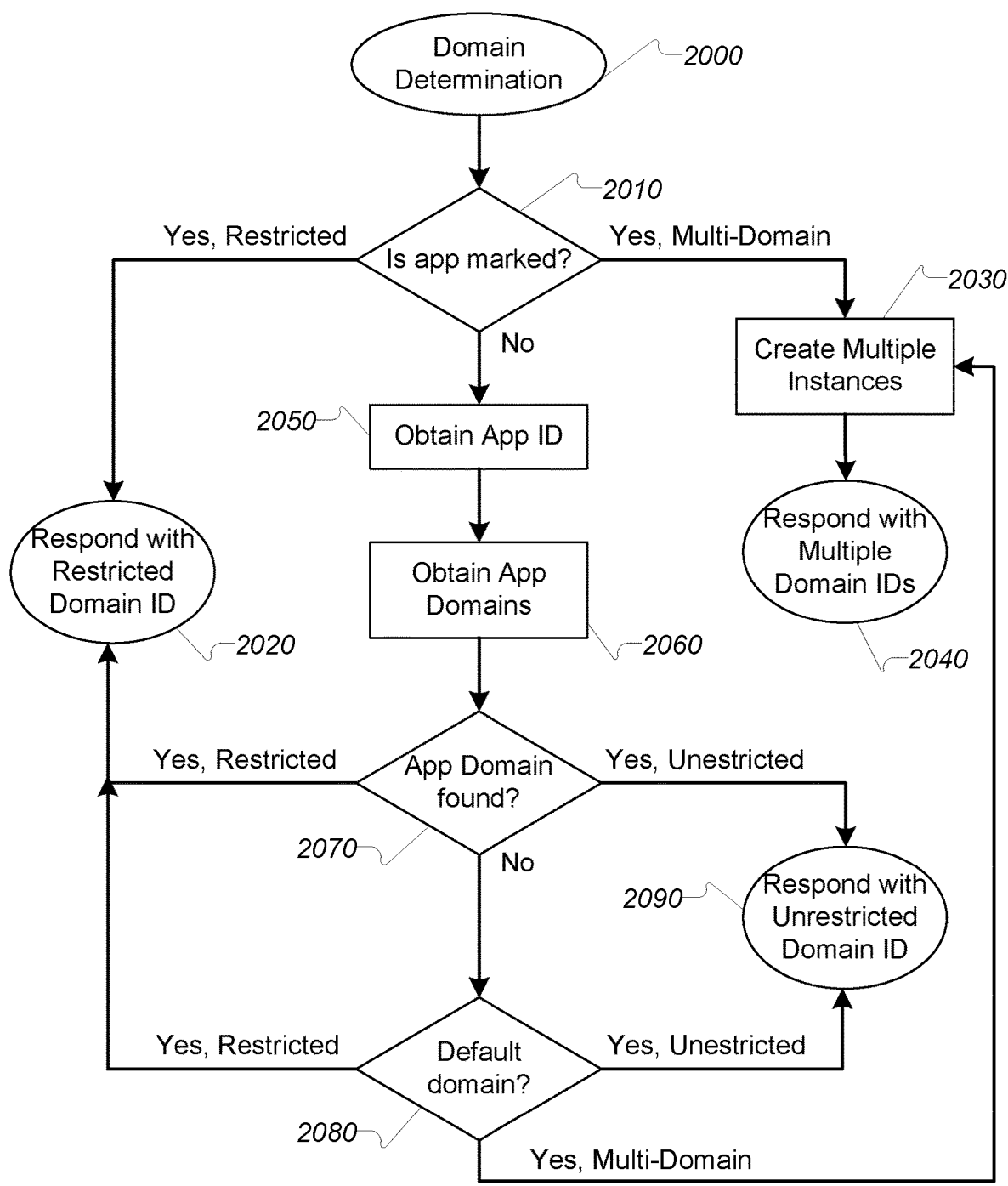
FIG. 2 depicts a flowchart of an exemplary method for determining the domain or domains of an application in accordance with the present invention.

FIG. 2 is a flowchart that describes a method for determining the domain of an application. This application domain classification method (2000) is carried out by a request mediation module. The first step is to check whether the application is marked as to domain (2010). This marking can be done, for example, using permissions on platforms based on Java, Access Control Labels (ACLs) on platforms that support them, or by other means. If the application is marked as restricted (2010), the application is classified as restricted and the process is complete (2020). If it is marked as multi-purpose (i.e. usable for multiple domains), the application is classified as multi-purpose, multiple instances are created (2030), one for each domain, and the process is complete (2040).

If the application is not marked at all, the next step is to obtain the application ID (2050). The application ID can comprise a cryptographic check-sum of the application, the application's certificate in the case of a signed application, or any other identifying characteristic or combination of identifying characteristics associated with the application. The request mediation module then uses the application ID to obtain the domain or domains associated with the application (2060). The information can be obtained by checking available policies for known domains to see which specify membership for the application, by checking with a policy server, by use of some aspect of the application ID as a lookup key in a table of domains, or by any other means deemed useful by those with skill in the art. If the application is in the restricted domain (2070), that information is returned, and the process is complete (2020). If the application is in the unrestricted domain (2070), that information is returned, and the process is complete (2090). If the application is in multiple domains (2070), multiple instances are created (2030), the list of domains is returned and the process is complete (2040).

If a domain for the application is not found (2070), for example if the policy source does not have a policy that specifies the particular application, the request mediation module can, in some exemplary embodiments, use a default domain specified by policy, if one is defined (2080). This default domain, again, can be restricted, unrestricted, or multiple domain, with appropriate responses being returned (2020, 2090, or 2040).

If the application is defined as multiple domain, the request mediation module may create multiple instances of that application. Each application instance is placed in one of the domains, so the various instances cannot communicate with each other, unless the policy permits it. The domain environment comprises any data files, configuration settings, saved cache, etc.

Persistent Association of Application Instances to Domains

In some exemplary embodiments, the results of a classification process may be persistently stored within a policy (modifying the policy). In other exemplary embodiments the results of a classification process may be persistently stored within the request mediation module or its data. In yet other exemplary embodiments, the results of a classification process may be persistently stored in other ways as determined proper by those with skill in the art.

6.5.1 Process Marking Attachment

In some exemplary embodiments, applications and/or application instances may have the domain to which they belong stored within the application instance itself, or with data associated with the application, such as a Java or Android manifest. The application classification process (above) results are captured and stored within the application and/or its data, and are made available to a request mediation module during subsequent calls. Early classification results and cached copies of late classification results may be handled in this manner.

In some exemplary embodiments, an exemplary method involving process marking can be used. When using this mechanism, the request mediation module uses another method, such as vector hooking, to link a classification module (which can be a part of a request mediation module) to the operating system (or application) so as to have it invoked at an appropriate stage of application instance instantiation, or other point in application instance processing prior to the application instance attempting to access a mediated resource. The classification module classifies the application instance as to the domain it is associated with using the domain determination procedure described below. The classification is then recorded in the application instance, in information associated with the application instances, or in the application instance process state within the OS. When the application instance makes a request that requires mediation, the request mediation module determines (based on the recorded classification), whether to transfer the request to the standard OS service module, or to a request mediation module where it is further processed. In either case, execution returns to the application instance when request handling is complete.

6.5.2 Privilege or Capability Marking

In some exemplary embodiments, such as those on devices that use the Android OS, domain membership can be determined based on permissions and capabilities as specified by such things as intent filters. When an application is created for such devices, a manifest that accompanies each application lists the permissions required by the application, and intent filters that describe some of its capabilities. Permissions and intent filters are used by the OS to determine which functions the application is capable of and allowed to carry out. Grants of permissions are typically provided by the device user at the request of the OS at application installation time, and in some cases at later times, such as when starting a VPN connection.

To use this method, in at least some exemplary embodiments, a Loader application is created with its manifest specifying at least the same permissions and capabilities as the application it is to load, but the names given to these permissions and capabilities are altered in a way specific to the domain the Loader application is intended for. For example, if a first DOMAIN-X application to be loaded specifies that it has an intent filter specifying that it can perform a "PROVIDE_VIEW" action, a first Loader application for this application will have in its manifest an intent filter specifying that it can perform the "DOMAIN-X-PROVIDE_VIEW" action. When a non-domain application requests a "PROVIDE_VIEW" action, the OS examines the intent filters of the applications on the device to determine which application can handle that action. The first application, as represented by the first Loader application, cannot; it handles DOMAIN-X-PROVIIDE_VIEW actions, not "PROVIDE_VIEW" actions and so it is not selected to deal with the non-domain application's request. On the other hand, if a second DOMAIN-X application requests "PROVIDE_VIEW" functionality, the second DOMAIN-X application's Loader application will translate this into a request for "DOMAIN-X-PROVIDE VIEW", and the first Loader application can be selected by the OS to handle the function. When the intent specifying the function requested is received by the first Loader application, it translates the function to remove the domain-specific portions added by the second Loader application before passing the request to the first DOMAIN-X application to be carried out. In a similar manner, privileges can be used to ensure that a requesting application has a privilege associated with the domain. In this way domain applications are identified and interactions with non-domain and other-domain application can be limited as required by policy.

6.6 Inter-Domain Import-Export Policy Enforcement Points

The domain namespace methods described above enable applications within a domain to interact with each other, and to avoid interaction with applications of other domains or that are not in any domain. This permits a domain to maintain control over its data, but can be overly restrictive in some situations. For example, if a device supports a contacts list containing data on phone numbers and associated names, and uses this for purposes of identifying callers, the caller ID function will not have access to domain name and number information unless it is a domain application, in which case it will not have access to non-domain name and number information. In either case, some numbers will not be properly identified, thus reducing the utility of the feature to the user. Some way to combine domain and non-domain data in a manner consistent with domain policies is needed.

A type of policy enforcement point, referred to herein as a Domain Import-export Policy Enforcement Point (DIE-PEP), is used to solve this problem. These are designed to be useful for inter-domain and extra-domain exchange of data according to relevant domain policies, and can be implemented in various ways, as described below.

Figure 8:
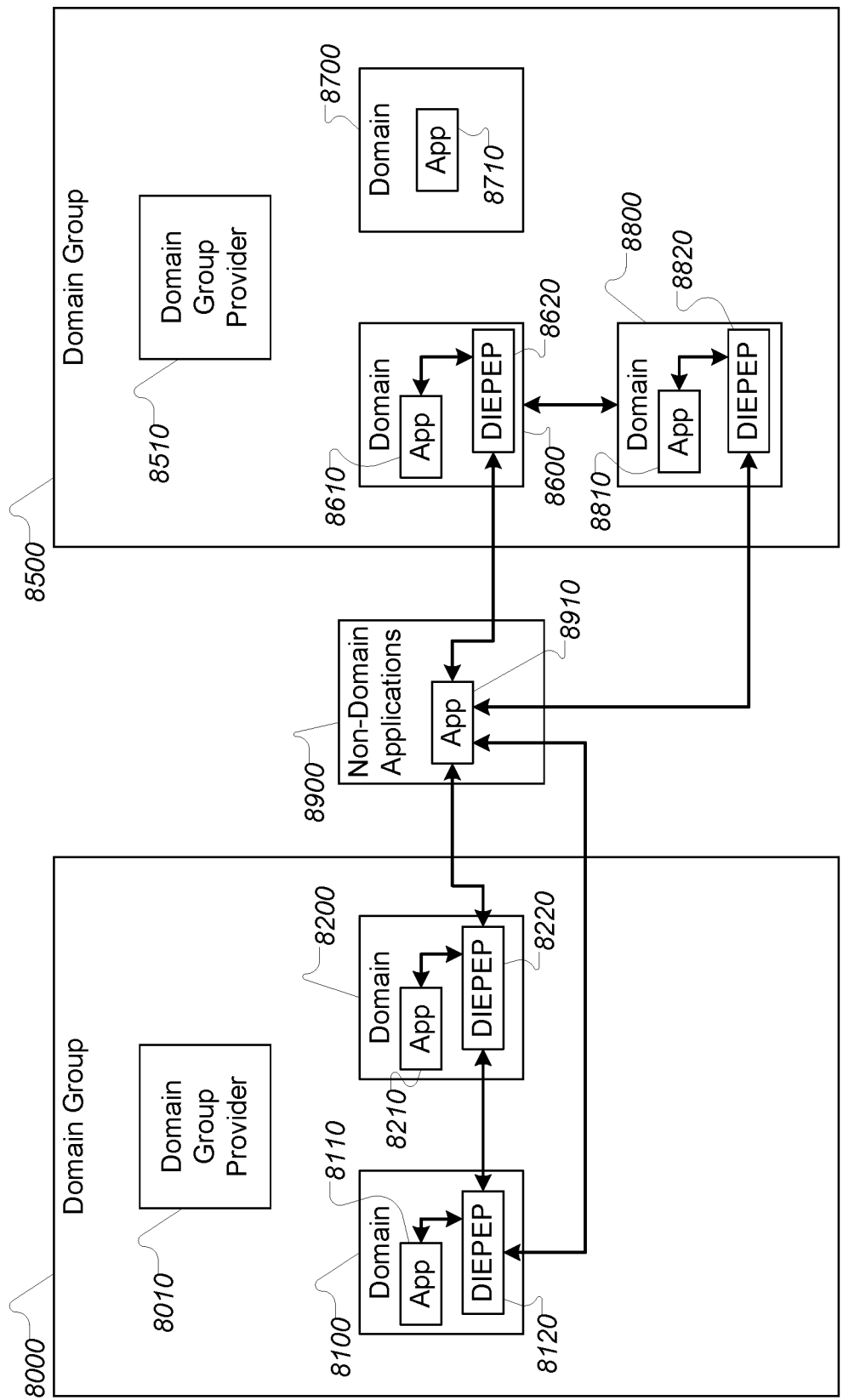
FIG. 8 depicts a diagram showing non-domain applications and two domain groups in a permission-based access arrangement.

6.6.1 Domain Import-Export Policy Enforcement Points Using Privilege or Capability Marking Scheme Under a privilege or capability marking scheme as described above, applications recognize the domain or lack of domain of other applications based on the privileges they possess or the capabilities they advertise. Applications, such as Loader applications, are constructed so as to request these privileges or advertise these capabilities. By constructing applications, such as Loader applications, to possess privileges and/or capabilities belonging to more than one domain, they are enabled to participate in each of these domains, and to interact with the domain applications of each. Constructing applications in this way requires that the domains they are to participate in be known at the time they are constructed, however, which reduces dynamic flexibility, and can require that all domains involved be supervised in some sense by a single entity or group of tightly cooperating entities (referred to herein as a "domain group provider") that coordinates domain import-export policy enforcement point construction for each domain in the domain group. Though they would be enabled to interact between domains of a single domain group, applications in a domain of one domain group would still be prevented from interacting with applications in a domain of a different domain group. FIG. 8 illustrates such a situation.

FIG. 8 shows two domain groups (8000 & 8500), each of which has a domain group provider (8010 & 8510). Non-domain applications (8900) also are shown (8910). The domains in the first domain group (8100 & 8200) each have domain applications (8110 & 8210) as do the domains of the second domain group (8610, 8710, & 8810). Several of the domains have domain import-export policy enforcement point applications (8120, 8220, 8620, & 8820); however one does not (8700). The applications, domain import-export policy enforcement points, domains, and domain groups shown in FIG. 8 are for purposes of simplified illustration of concepts, and in an actual implementation there would typically be a plurality of applications and/or domain import-export policy enforcement points in each domain, as well as additional non-domain applications on a device; these elements are implemented without modifying applications and without requiring operating system privileges. The forgoing can be implemented by those having ordinary skill in the art.

Applications in the first domain of the first domain group (8110) are enabled by one or more domain import-export policy enforcement points of that domain (8120) to interact with applications in the second domain of the first domain group (8210) through one or more domain import-export policy enforcement points of the second domain of the first domain group (8220). Likewise the domain import-export policy enforcement points of the domains of the first domain group (8120 & 8220) enable applications of each domain (8110 & 8210) to interact with non-domain applications (8910) to the extent permitted by the policy of each domain (8100 & 8200). Likewise, the applications of the first and third domains of the second domain group that support domain import-export policy enforcement points (8600 & 8800) are enabled to interact with each other (8610 & 8810), or with non-domain applications (8910) through their domain import-export policy enforcement points (8620 & 8820). Because it has no domain import-export policy enforcement points, applications of the second domain of the second domain group (8710) cannot interact with applications of other domains (8610 & 8810), or with non-domain applications (8910).

In situations where there is only one domain group, this method of providing inter-domain and extra-domain exchange under policy control works well, especially when the device OS provides features supportive of its implementation. In situations where there can be two or more domain groups, the inability to coordinate access between the domains of each domain group can reduce utility for the user and create inconvenience. To avoid these problems in such situations, a method involving dynamic checking for the domain of an application can be used.

6.6.2 Dynamic Domain Checking Scheme

Figure 9:
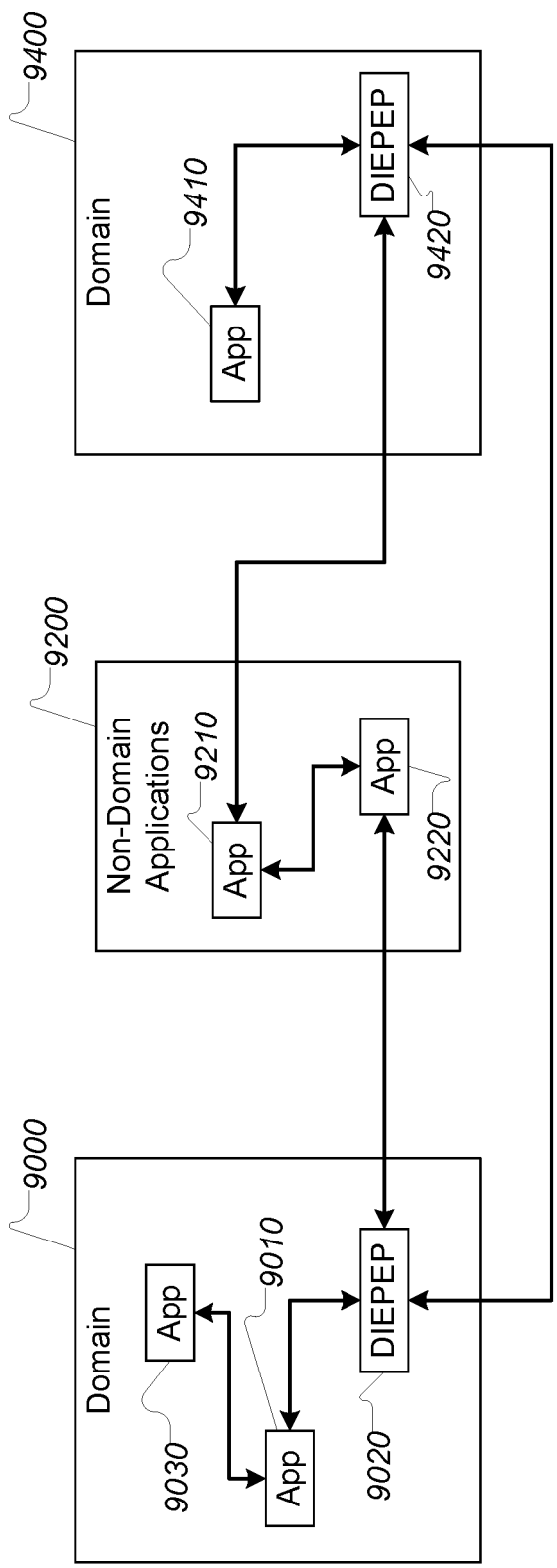
FIG. 9 depicts a diagram showing non-domain applications and two domains in a dynamic check-based access arrangement.

FIG. 9 illustrates a simplified exemplary situation involving two domains (9000 & 9400) and their domain applications (9010, 9030 & 9410) as well as some non-domain applications (9200). Each domain has at least one domain import-export policy enforcement point (9020 & 9420) to enable intra-domain and extra-domain data exchange to the extent permitted by the respective domain policies. Applications in the first domain (9010) can exchange data with applications of the second domain (9410) as permitted by policy, or with at least one of the non-domain applications (9220), also as permitted by policy. Applications of the second domain (9410) can exchange data with applications of the first domain (9010, 9030) as permitted by policy, or with at least one of the non-domain applications (9210), also as permitted by policy. These data exchanges are enabled and moderated by the domain import-export policy enforcement points of the two domains (9020 & 9420) as permitted by the respective domain policies of each. The forgoing can be implemented by those having ordinary skill in the art.

In the dynamic domain checking method, domain membership of a domain import-export policy enforcement point or an application is done using policy elements that describe applications or their characteristics in conjunction with checks by the involved policy enforcement points (domain import-export policy enforcement points, Loader applications, or other policy enforcement points) at the time a request is made between applications or policy enforcement points. For example, if a first application in a first domain (9010) makes a request for data from a second application in the first domain (9030), the second application (9030) checks the first application (9010) for domain membership before responding to the request. The check can be for characteristics of the first application (9010) such as its UIC, the file storage location it was run from, the signature it was signed with, a password or other authentication, or any other characteristic is possesses that is useful for identifying the application uniquely or as a member of a selected group. The check can be performed by an aspect of the OS on some devices, or in a policy management point or policy enforcement point, such as a Loader application, depending on the implementation chosen by those with skill in the art. Domain policy will comprise policy elements that define the characteristic(s) required for an application to be considered a member of the domain. If the characteristics of the first application (9010) meet those required by domain policy, the second application (9030) will respond to the request. If they do not, the second application (9030) will ignore the request, respond with an error, or take other action to refuse the request as deemed proper by those with skill in the art.

When using a domain import-export policy enforcement point to access data or applications in other domains, similar checks are performed, but there can be additional policy elements involved when a reference is to an application or data in another domain, or in no domain that restrict requests differently than when they are made between applications within a domain.

Implementation of domain import-export policy enforcement points in the dynamic domain checking scheme can be done in ways that are not possible with the privilege or capability marking scheme. Because there is no requirement for domain import-export policy enforcement points to be privileged in domain-specific ways, or to declare domain-specific functionality, there is no need to construct special domain import-export policy enforcement point applications with these characteristics. This permits domain import-export policy enforcement point functionality to be incorporated into, for example, Loader applications, or policy management points, and for the policy concerning inter-domain or extra-domain requests to change without requiring that domain import-export policy enforcement point functionality be rebuilt and reinstalled. There is also no requirement for the concept of domain groups, though such can optionally be retained for purposes of referring to sets of domains collectively in policy specifications.

6.6.3 Non-Domain Application Access to Domain Data

The domain import-export policy enforcement point methods described above are useful for limiting domain application interaction with applications of other domains, or with non-domain applications, as required by domain policies. Access to domain data by non-domain applications is not, however, enabled by these methods alone. Domain applications can be constructed, using such methods as Loader applications, to redirect requests for data to domain import-export policy enforcement points, which can obtain the data, policy permitting, from other domains, from non-domain sources, or both, and provide it to a requesting domain application. For example, a domain calendar application can directly obtain domain calendar data from a domain calendar data provider, and can obtain non-domain calendar data from a non-domain calendar data provider using a domain import-export policy enforcement point. These can be combined into a domain calendar display and shown to a user as an integrated calendar. A non-domain calendar application has no means for doing so, because it only has access to non-domain calendar data, and is not designed to work with domain import-export policy enforcement points to request domain data. While domain information is placed in a domain to prevent its access by non-domain applications in general, there can be scenarios in which some domain information can be safely released to non-domain applications. Such releases can be specified in domain policy, but a means to enable such releases is needed. One way to enable such releases involves the use of special purpose domain import-export policy enforcement points. These will be described by way of several examples below. Those will skill in the art will understand how to extend these methods for other specific uses.

6.6.3.1 SMS Example

On some devices, such as Android cell phones, there is an "SMS" feature that displays message received using the "Simple Message Service". This is received by a non-domain phone application which makes an ordered broadcast request (i.e. a request conveyed to a set of subscribing applications in a defined order) for processing and display of the SMS message. In the typical case, higher priority broadcast receivers handle the request first, and then either abort the broadcast, or pass it along to the next broadcast receiver in priority order. The lowest priority receiver is a display activity that puts the message in an "inbox" for an SMS reader application to display, forward, or otherwise handle for the user.

By adding a broadcast receiver of high priority to the list of broadcast receivers for SMS requests, a domain import-export policy enforcement point for a domain can arrange to be invoked when an SMS text arrives and an ordered broadcast is sent. The domain import-export policy enforcement point, being a member of the domain, can access domain information, such as the domain SMS "inbox", and, if policy permits, and the message qualifies under policy requirements, put the SMS text into the domain SMS "inbox". If the message does not qualify under policy requirements as a domain SMS text, the broadcast can be passed to the next broadcast receiver in priority order. Using this method, a plurality of domains can be queried for interest in the SMS text message, and whichever domains possess policies matching it can keep it, and those that don't can pass it along. It is also possible to save the SMS text in a domain "inbox" as well as passing the broadcast to the next receiver when policy permits or requires that behavior. Policy controls which requests are responded to, and how. For example, rather than saving the SMS text in the domain "inbox" and aborting the broadcast or passing the SMS text message along to the next receiver unmodified, the domain broadcast receiver could save the message as-received in the domain "inbox", and then modify the SMS text message to read, "SMS text received for domain 'X'", to let the user know that an SMS text has arrived for the domain, in case the user does not have the domain SMS text reader application running at the time, but does have a non-domain SMS text reader active.

Any non-domain application using such a broadcast method to acquire data can be provided with domain data, or restricted from it, under policy control in a similar manner.

Domain import-export policy enforcement points as described can be implemented as separate applications, combined into a single domain import-export policy enforcement point application with a plurality of different domain import-export policy enforcement point functions, or incorporated into other components, such as policy management points, as described elsewhere herein.

6.6.3.2 Applications with APIs Example

In some cases a non-domain application will provide a facility to allow the application functionality to be extended. For example, some web browsers support a "plug-in" capability where software modules can be constructed and added to a pre-existing web browser to extend its functionality beyond what it was created initially to have. In other cases such methods are referred to as "hooks," "APIs," "callable extensions," or "loadable modules," among other terms, but all serve the purpose of extending the capability of an existing application, without requiring modification to the application's source code or rebuilding the application. When an application provides such a facility that allows extension of its ability to access data, a domain import-export policy enforcement point can make use of it to enable the application to access domain data, so long as such access is maintained consistent with domain policy. Such a domain import-export policy enforcement point can, depending on the requirements of the target application's interface, be implemented as code to be incorporated into the application, a separate application, library or service to be invoked by the target application, or a plurality of cooperating components, some of which can be implemented using one or more of these methods, or others as will be understood by those with skill in the art.

6.6.3.3 Calendar Application Example

When a non-domain application requires use of domain information, and the domain policy permits extra-domain use of the required data, but the non-domain application does not provide other means for domain components to convey the data to it, a domain import-export policy enforcement point can be used to copy the data from the domain data source (e.g. a data provider, stored data, etc.) to the non-domain data storage location (e.g. a shared file, a data provider such as a contacts application or calendar data application, etc.). The copy of the data can be refreshed periodically, when it changes, when the domain is activated, or at other times or under other conditions as determined by the design and configuration of the domain import-export policy enforcement point and domain. The copy of the data can, when determined to be proper by those with skill in the art, be removed from the non-domain application or storage location when the domain import-export policy enforcement point is stopped, the domain is removed from the device, or otherwise.

Figure 10:
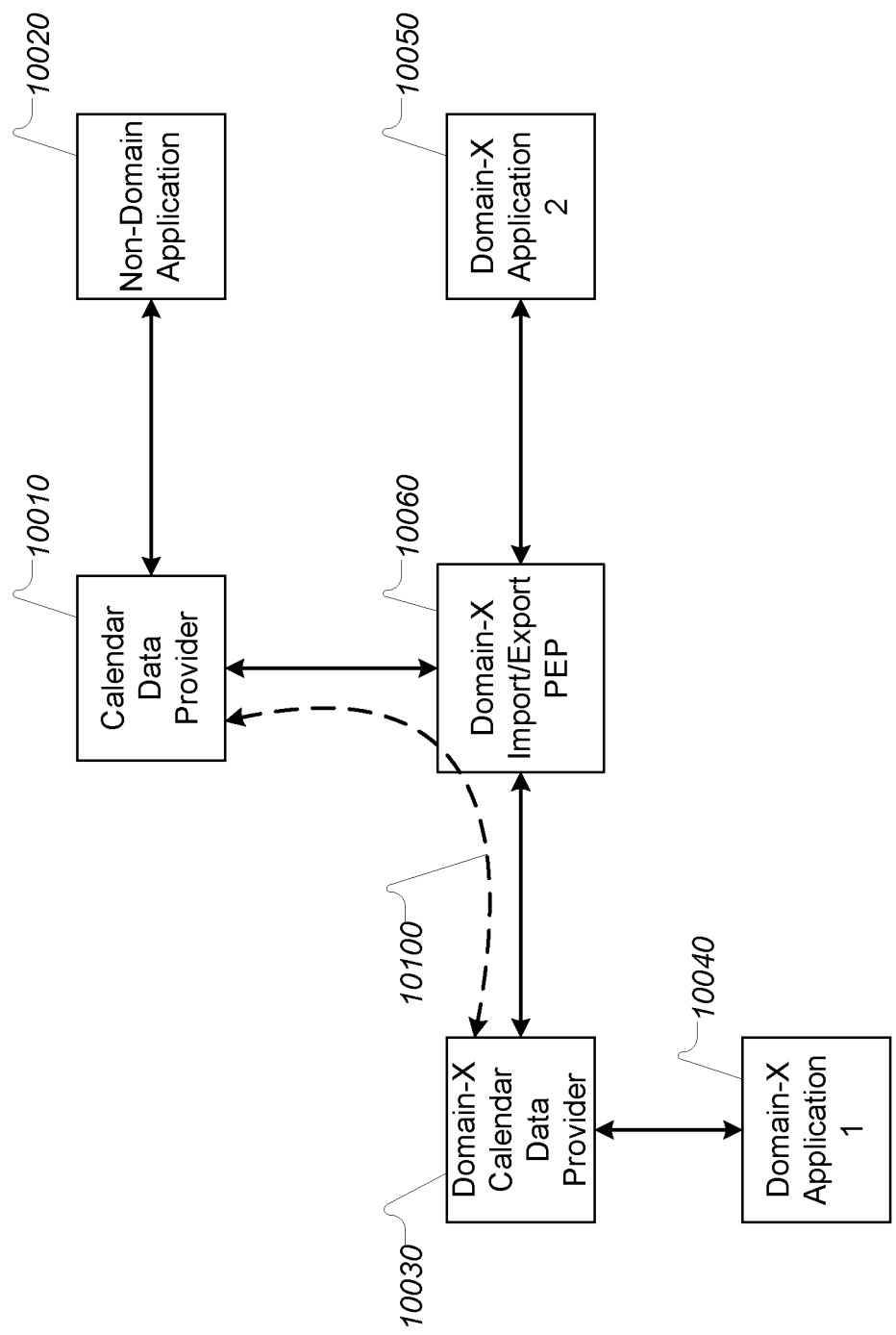
FIG. 10 depicts a diagram showing a domain import-export policy enforcement point mediating access to domain and non-domain data providers by domain and non-domain applications.

For example, FIG. 10 shows a scenario in which a typical OS-provided calendar data provider application (10010) is accessed by a non-domain application (10020) to obtain calendar data to display to a user. The user will be shown only non-domain calendar data in such a situation, as the domain calendar data provider (10030) that holds domain calendar data is not accessible to the OS-provided calendar data provider (10010). Such a situation could be problematic for the user, who might think that a block of time is free, when it actually contains a business meeting for instance.

If the user accesses a domain calendar application (10040), domain calendar data items will be shown, but non-domain calendar items will not appear, because the calendar application being used in the domain (e.g. loaded into a Loader application) is not designed to have the capability to reference multiple calendar data sources because its designers only expected there to be one on the device.

To enable seeing both sets of calendar items in a single display, a domain import-export policy enforcement point (10060) can access the domain calendar information provider (10030) to acquire the domain calendar information, and then give a copy of this information (10100) to the non-domain calendar data provider (10010). Once the non-domain calendar data provider (10010) has both sets of calendar information, the non-domain calendar application (10020) can display a calendar containing both types of information and the user can have a more complete view of upcoming or past events. Note that the domain import-export policy enforcement point (10060) that is copying the data (10100) to the non-domain calendar data provider (10010) does so under domain policy limitations. These might restrict the type of calendar data copied, ranges of times that can be copied, the content of the data items copied, etc. For instance, domain calendar entries might be copied as events that only mark blocks of time "BUSY," without specifying any details of the events. If the user wants to see the details, these would have to be accessed by a domain calendar application (10040 or 10050), which has access to the domain calendar data provider, either directly and solely as in the case of the first domain calendar application (10040), or through a domain import-export policy enforcement point (10060) that merges the domain calendar data from the domain calendar data provider (10030) with non-domain calendar data obtained from the non-domain calendar data provider (10010) before providing it to a calendar application, as in the case of the second domain calendar application (10050).

In some exemplary embodiments the domain import-export policy enforcement point used in this exemplary use case will be designed specifically to handle calendar data access between a domain and non-domain application or data provider. In other exemplary embodiments a more generic domain import-export policy enforcement point can be used, and configured for such use through policy elements, configuration files, or other methods. In yet other exemplary embodiments, the domain import-export policy enforcement point can be designed to carry out additional import and/or export tasks for a domain, rather than using a plurality of domain import-export policy enforcement points to carry out the same tasks. In any of these embodiments, the domain import-export policy enforcement point can optionally be designed for use in sharing data between domains as well.

6.7 Machine Implementation

As will be apparent to those having ordinary skill in the art, the present invention is implemented in digital electronic circuitry, or in computer hardware, firmware, software, or in combinations thereof. Software of the invention can be implemented in a computer program product tangibly embodied in a machine-readable storage (i.e., non-transitory) device for execution by a programmable processor; and method steps of the invention can be performed by a programmable processor executing a program of instructions to perform functions of the invention by operating on input data and generating output in the form of data structures encoded in memory devices and transformed using a processor that manipulates data in the form of signals retrieved from the memory and returns a transformed data structure in computer memory. The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; the language can be a compiled or interpreted language. Suitable processors include, by way of example, both general and special purpose microprocessors. Generally, a processor will receive instructions and data from a read-only memory or a random access memory or a combination thereof. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users. Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave.

The above-described devices and materials will be familiar to those of skill in the computer hardware and software arts. It should be noted that the present invention employs various computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities. The present invention also relates to devices, systems, or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

7 EXAMPLES

The following examples are provided to illustrate the implementation and advantages of the invention described herein, and are not to be interpreted as limiting the present disclosure in any way.

7.1 Salesforce Access in an Isolated Domain 7.1.1 Features Demonstrated:

Policy-based storage isolation

Policy-based configuration of applications

Identification and use of domain-member applications

Creation and use of domain isolated storage.

Creation and use of a domain-isolated contacts list, mapping of domain-specific applications that require contacts to the domain-isolated contacts list and precluding other contacts lists.

Configuring domain-email application (including credentials, servers, and options) from domain policy.

7.1.2 Scenario:

An enterprise defines an isolated domain to permit a salesman to create and update pricelists for customers. A salesman uses the isolated domain applications to download a price list template from a network-based instance of Salesforce, edit it locally on the mobile device using an installed Microsoft Office-compatible application, and then sends the updated price list to the customer using the domain-email application. Access to Salesforce is provided by a domain-isolated Salesforce application which is configured in accordance with policy for access to Salesforce and for use of local domain-isolated storage, which also provides synchronization of contacts and emails between the domain-storage and the Salesforce application. Local editing is performed using a domain-isolated Microsoft Office Excel-compatible spreadsheet application that is configured to use only domain-isolated storage. Email access is provided by the domain-email application, which is configured in accordance with policy to access corporate email servers and to store its local email storage within the domain-isolated storage.

The domain as described herein allows the individual domain-applications to be woven together so domain-member applications share data only between themselves, enabling functionality without the exposure of domain-based information.

7.1.3 Implementation:

The enterprise domain administrator defines a policy that defines one or more aspects of a domain, including:
 a. A private (e.g. encrypted) domain storage location on the local device.
 b. A private contacts storage location (located within the private domain storage), and a mapping of domain applications requesting contact information to it instead of to the device's non-domain contacts storage.
 c. Specification of domain-member applications, comprising a Salesforce application, Microsoft Office Excel-compatible spreadsheet application, and Corporate email application as applications that operate within the domain.
 d. Salesforce credentials for accessing the corporate Salesforce instance.
 e. Email credentials, configuration, and options.

The domain policy is distributed through one or more policy management points which allocate it to policy enforcement points, which translate and enforce domain policy as follows (for example):

The private domain storage location is translated to a local, encrypted storage location (e.g. a file system) on the local device, for example on the device's SD card. The private domain storage is mapped and permissioned so it is accessible only to domain applications (for example, using the device OS's user or group ID file protection mechanisms).

The contacts storage location is defined as residing within the private domain storage location. This location, in this example, is a file of contact information. This information is provided to various policy enforcement points to enforce mapping of contacts storage requests to the private domain storage location.

The domain-member applications are defined, and domain-specific distributable policy enforcement points (e.g. Loader applications) are generated for each domain-member application. Each of the domain-specific distributable policy enforcement points is downloaded and installed on the local device. If a domain-specific distributable policy enforcement point requires another application to be downloaded, that application is also downloaded and installed on the local device. Each domain-specific distributable policy enforcement point comprises policy-based redirection capability to redirect requests for configuration, contacts, and local storage information to the private domain storage.

One or more policy-enforcement points, or other components of the architecture that may specify content in the private domain storage location, converts policy-based configuration parameters to application-specific configuration parameters, and stores them in application-specific file formats, and causes these configuration files to be stored in the private domain storage location. Alternatively, the application-specific configuration parameters are converted to application-specific API calls which are used to configure the application in accordance with the policy.

When a user selects a domain-member application for execution, they are actually selecting the domain-specific distributable policy enforcement point for the selected application. The domain-specific distributable policy application point performs the following steps:
 a. Performs any necessary policy checks to ensure that the correct policy and domain-specific distributable policy enforcement points are available for use.
 b. Creates a domain-specific application operating environment. The operating environment selects the private domain storage location and makes it available to the application. In this example, the policy enforcement point(s) map an encrypted file system and mounts it for use by the application(s).
 c. Loads application and policy-enforcement point code, as described above, using domain-specific code as required to implement policy. For example, provider classes for contacts may be added that redirect requests for contacts information to a domain-specific contacts storage file instead of using the local device's default contacts storage.
 d. Executes the loaded application and policy-enforcement point code, in order to provide the domain-member application functionality to the user.

7.1.4 Use:

A salesman is using a local device configured with the above domain to generate a customer-specific price list and forward it to a customer. The price list and customer information is managed within the domain, which provides separation of domain-isolated information from other information on the salesman's local device.

The salesman first selects the domain-member instance of the Salesforce application and starts the application. The domain-member Salesforce application starts, and using the domain-specific configuration information provided within the private domain storage, connects to the network-based Salesforce service. The user interacts with the domain-member Salesforce application to download a price list, saving the price list as a spreadsheet file to local device storage. The save request is redirected to the private domain storage, causing the spreadsheet to be saved in the private domain storage instead of in the non-domain (e.g. unprotected) storage of the local device. The domain-member Salesforce application also downloads the salesman's customer list and saves it into the contacts storage on the local device. In an Android implementation, reading and writing of the contacts information from and to contacts storage is intercepted by a domain-specific provider class provided by the distributable policy-enforcement point that redirects these requests to the domain-specific contacts information in accordance with domain policy.

The salesman quits the domain-member instance of the Salesforce application and inspects their local SD storage contents using the local device's file browser application (a non-domain-member application). The downloaded price list and contacts information are not visible to the salesman in a usable form; only the encrypted form of the data is viewable. Similarly, the newly downloaded contacts information is not visible in usable form to non-domain-member applications such as the phone dialer and non-domain version of the email program.

The salesman then starts the domain-member instance of the Microsoft Office Excel-compatible spreadsheet application to edit the downloaded price list. This loads the distributable policy-enforcement point and the Microsoft Office Excel-compatible spreadsheet application as described above. The salesman uses the domain-member instance of the Microsoft Office Excel-compatible spreadsheet application to look for the downloaded price list. This request is transparently redirected to the private domain storage location by policy-enforcement point components, which decrypt the information as it is read. The salesman sees the downloaded price list file, which he selects and edits, and then saves using the domain-member of the Microsoft Office Excel-compatible spreadsheet application. The salesman then selects the "Send to" option to forward the modified price list to the customer. The "Send to" option of the domain-member Microsoft Office Excel-compatible spreadsheet application identifies the available file-send providers, e.g. those domain-member applications that provide for sending a file. This includes the domain-member email application. A non-domain-member email application send-to function is masked by actions of the policy enforcement point and is not made available to the salesman for selection.

The salesman selects the domain-member email application from the options and the domain-member Microsoft Office Excel-compatible spreadsheet application "sends" the file to it. This starts the domain-member email application, which uses its policy enforcement point to access the policy-specified email configuration (stored in the private domain storage) and contacts information. The domain-member email application receives the price list file from the domain-member Microsoft Office Excel-compatible spreadsheet application and presents the salesman with a user interface to select the person to email the file to. The salesman selects from the list of domain-specific contacts, as the contacts selection list is populated from the contacts downloaded from Salesforce because the policy-enforcement point has intercepted the contact provider request and redirected it to use the domain-specific contacts. The salesman selects the customer information from the domain-specific contacts and sends the email containing the price list to the customer. The domain-member email application uses the configuration information provided in the domain policy to connect to the corporate email server to complete sending the email.

The salesman then quits the domain-member email and Microsoft Office Excel-compatible spreadsheet applications and starts his non-domain member instance of the email application. Because the non-domain-member version of the application is started, there is no policy enforcement point to intercept the requests to the contacts provider and email application and the salesman sees his personal contacts and email configuration and not the domain-protected versions of the contacts and emails. Alternatively, the salesman can start the non-domain-member version of the email application and simultaneously access domain-member email in the first instance and personal (non-domain-member) email in the second instance, where the first and second email instances are isolated from each other based upon their domain membership.

7.2 Corporate Storage Synchronization/Integration
7.2.1 Features Demonstrated:
  Policy-based storage isolation
  Policy-based configuration of applications
  Identification and use of domain-member applications
  Creation and use of domain isolated storage.
  Integration of domain-isolated storage with policy-configured network storage.
7.2.2 Scenario:

An enterprise defines an isolated domain to permit an insurance adjuster to create and manage case files and to integrate these items with the insurance company's networked storage. The insurance adjuster uses domain-member applications to capture pictures using the local device, store these pictures in an isolated manner, then integrate these pictures into the insurance company's network-based systems. Multiple types of integration are envisioned, including file sharing, corporate repositories, and backup/restore for device disaster recovery.

7.2.3 Implementation:

The enterprise domain administrator defines a policy that defines one or more aspects of a domain, including:

a. A private (e.g. encrypted) domain storage location on the local device.

b. Domain-member applications, comprising an insurance company application, browser, camera, network synchronization application, SharePoint, and corporate network storage applications as applications that operate within the domain.

c. Network system credentials for accessing the insurance company's networked systems.

The domain policy is distributed through one or more policy management points which allocate it to policy enforcement points, which translate and enforce domain policy as follows (for example):

The private domain storage location is translated to a local, encrypted storage location (e.g. a file system) on the local device's SD card. The private domain storage is mapped and permissioned so it is accessible to domain applications.

The domain-member applications are defined, and domain-specific distributable policy enforcement points are generated for each domain-member application. Each of the domain-specific distributable policy enforcement points is downloaded and installed on the local device. If a domain-specific distributable policy enforcement point requires another application to be downloaded, that application is also downloaded and installed on the local device. Each domain-specific distributable policy enforcement point comprises policy-based redirection capability to redirect requests for configuration and local storage information to the private domain storage.

One or more policy-enforcement points, or other components of the architecture that may specify content in the private domain storage location, converts policy-based configuration parameters to application-specific configuration file formats, and causes these configuration files to be stored in the private domain storage location.

When a user selects a domain-member application for execution, they are actually selecting the domain-specific distributable policy enforcement point for the selected application. The domain-specific distributable policy application point operates as described above.

7.2.4 Use:

The insurance adjuster uses the company provided claims processing application to receive notification of a claim for adjustment. This application is a native, platform specific application that has been integrated with a domain-specific policy enforcement point. The policy enforcement point provides domain-specific configuration information that permits the insurance adjuster to access the insurance company claims system and to download claims information to the local device. The policy enforcement point configures and provides private domain storage for these items, and redirects the information downloaded from the insurance application to private domain storage. A user accessing a non-domain specific version of the insurance claims processing is unable to access information in the private domain storage or the insurance company network resources.

While processing the claim, the insurance adjuster accesses the domain-member camera application to take a picture of a property that was damaged, and saves the picture using the application save. The domain-specific policy enforcement point redirects this save to the private domain storage by overriding the picture provider. The insurance adjuster also uses the domain member web browser application to access public records information about the property and to save copies of that information. Again, the policy enforcement point redirects the saved copies to the private domain storage.

As before, information saved to private domain storage are not accessible from non-domain member applications, such as the insurance adjuster's non domain-member photo albums and file browser.

Because of the risk of loss or damage to portable local devices, the domain administrator configured a domain-specific version of a network synchronization application. This application is encapsulated in a policy enforcement point and is invoked by the local device on a periodic basis to synchronize local storage to a network disk drive. The insurance company provides the network resource and provides access credentials to the domain-specific network synchronization application. When invoked, the domain specific network synchronization application is activated in an environment controlled by the domain specific distributable policy enforcement point, which makes the private domain storage available to the network synchronization application. The network synchronization application uses the configuration information in the private domain storage to configure its connection to the company-provided synchronization resource and synchronizes the private domain storage to the company-provided synchronization resource. This provides an automatic backup/restore capability in case of lost or damaged local devices, as well as information synchronization between peered local devices (such as an insurance adjuster's phone and her desktop system). Similarly, the insurance company's admin has provided for a domain-member team Dropbox application that supports synchronization of the private domain storage with a team Dropbox storage location. The domain-member team Dropbox application is invoked in the same way as non-domain-member Dropbox applications, except that the distributable policy enforcement point makes the private domain storage available to the Dropbox application in order to provide Dropbox configuration information and files stored in the private domain storage. In this manner, the domain-member applications have provided for both network synchronization of private domain information and for team-based sharing of private domain information where specifically enabled by domain policy, while excluding access to the private domain storage for the non-domain-member versions of these applications.

The domain administrator also configures a corporate repository for use within the domain. In this example, the corporate repository is a SharePoint site for the claim to which completed information is uploaded under the direction of the insurance claims application. The domain policy identifies the SharePoint site and provides credentials for the insurance adjuster to access it, and the domain-member SharePoint access application is provided both the SharePoint site information and access to private domain storage. The native insurance claims application (discussed earlier) makes an interprocess call to invoke the SharePoint access application. This call is intercepted by the policy enforcement point and redirected to the domain-member SharePoint access application, where the request is processed and files and information uploaded to the claim specific SharePoint site.

Using similar techniques, the system can provide the following features to domain-member applications without modification of the applications.

1. Making a network-based filesystem (e.g. NFS, Dropbox) available as a standard local filesystem for all applications: Loaders can be used to present a network-based filesystem as if it were a local filesystem, to any application that is filesystem ready. This lets any application use enterprise file shares or the Dropbox cloud as if it were folders on the local device.
2. Backup and restore: Because the domain has knowledge and control over all the data for domain applications, the domain can take periodic snapshots of each application's data and other shared data (e.g. using a policy management point to assign the task to a policy enforcement point), and back it up to the cloud or network. This can be restored in the event of data loss, or if the user wishes to migrate to a new device.
3. Cloud-based operation: The device could operate off of cloud-based storage instead of local storage by mapping private domain storage to a network cloud provider. In fact, multiple devices could serially be used interchangeably. With proper conflict resolution, multiple devices could be used simultaneously.
4. Mirroring: With a local cache of the data, along with a cloud copy, whether one of the other is primary, the device can operate online and offline.

7.3 Device-to-Device Migration 7.3.1 Features Demonstrated

Policy-based multi-device use of applications designed for single device use.

7.3.2 Scenario:

A game application is provided that operates on a single local device and permits the saving and resumption of game state. The user wants to start playing the game application on a tablet, then suspend the game and resume playing it on their mobile phone. A game provider can enable this scenario by combining the network synchronization features as part of a domain with a domain-member gaming application; and deploying this domain to the user's mobile phone and tablet. This enables a user playing a game designed for a single local device to save their game state, synchronize the game state with the network, and then resume game play on an alternate device.

7.3.3 Implementation:

A mobile network carrier provides a mobile device-based game application that was developed for a mobile phone. The carrier offers a "play anywhere" ability, which is enabled by creating a shared domain for the game application. The domain is provided for all of the user's mobile devices registered with the carrier. For example, a user may have a mobile phone and a tablet. The carrier provisions a domain for the "play anywhere" game, which is then provided to the user for use on their phone and tablet.

The provisioned play anywhere game is described by a policy that comprises:
a. A private domain storage location on the local device.
b. Domain-member applications, comprising a game application that operates within the domain.
c. Network system credentials for accessing the insurance company's networked systems.
d. A list of devices authorized to instance the domain.

The domain policy is distributed through one or more policy management points which allocate it to policy enforcement points, which translate and enforce domain policy as follows (for example):

The private domain storage location is translated to a local, encrypted storage location (e.g. a file system) on the local device's SD card. The private domain storage is mapped and permissioned so it is accessible to domain applications.

The domain-member applications are defined, and domain-specific distributable policy enforcement points are generated for each domain-member application. Each of the domain-specific distributable policy enforcement points is downloaded and installed on the local device. If a domain-specific distributable policy enforcement point requires another application to be downloaded, that application is also downloaded and installed on the local device. Each domain-specific distributable policy enforcement point comprises a policy-based redirection capability to redirect requests for configuration and local storage information to the private domain storage.

One or more policy-enforcement points (or other components of the architecture that may specify content in the private domain storage location converts policy-based configuration parameters to application-specific configuration file formats, and causes these configuration files to be stored in the private domain storage location.

When a user selects a domain-member application for execution, they are actually selecting the domain-specific distributable policy enforcement point for the selected application. The domain-specific distributable policy application point operates as described above.

7.3.4 Use:

The user downloads the domain-member application to their mobile device and begins playing by starting the application. The distributable policy enforcement point checks the list of policy-authorized devices to determine if the domain-member application may be instanced on a particular device. If the application is not authorized on the device, the domain-member application is not permitted to complete its load and start. The distributable policy enforcement point associated with the domain-member application maps the game application's state storage to the private domain storage, from where it is synchronized with the carrier's network storage. In alternative implementations, the carrier could define private domain storage that is a local cached copy of the content in a network storage system provided by the carrier. In either case, the domain implementation results in the saved game state being stored in the carrier's network storage.

The user downloads the domain-member application to their second mobile device, which is also synchronized with the carrier's network storage. This results in an instance of the saved game state being stored on the second mobile device in private domain storage. The domain-member application, when started, accesses the private domain storage and finds the saved game state. The user may elect to restore the saved game and continue playing on the second device.

Depending upon the desired implementation, the network carrier may implement any desired network-based storage model. Options range from always-on dedicated network storage mapped as private domain storage (possibly with local cache) and storage of local application information with synchronization or copying to the network.

7.4 Domain-Based Replacement of a Standard Interface 7.4.1 Features Demonstrated:
Policy-based association of applications, replacement of classes loaded by policy.

7.4.2 Scenario:

A particular user requires accommodation for use of workplace applications, in particular, the modification of specific applications to use gesture-based controls instead of touch inputs. A domain is defined that implements the accommodation by including one or more workplace applications with adaptive software that modifies the input and/or output of the workplace application to accommodate a user.

7.4.3 Implementation:

A domain policy is defined that requires alternative adaptive controls for use with a specific set of domain applications. In this example, a "soft" keyboard is replaced with a gesture-based recognizer for an email application. Other implementations utilizing domain-specific adaptive applications are contemplated, such as the domain-specific augmentation of text-based output by a text-to-speech output application.

In this example, a domain policy is defined that defines the domain-member email application and its required use of the gesture-recognizer. A domain-specific policy enforcement point is created that loads the email application and the gesture recognizer, and maps requests for keyboard input from the email application to the gesture recognizer instead of the keyboard.

Unlike existing all-or-nothing replacement input device approaches, this mechanism associates the adaptive application with specific domain-member applications rather than all applications. This approach is also advantageous for integration of specialty authentication mechanisms, such as token-based second factors, domain specific lock/unlock codes, and related security-based techniques.

7.5 JNI Application Integration 7.5.1 Features Demonstrated:
Policy-based network access redirection with native code applications.

7.5.2 Scenario:

A user wants to use a domain-member web application to download a particular file from an internet web server into the private domain storage of his device so that it can then be sent to a colleague through email. The URL of the file is "HTTP://somesource.dom/dl/file.txt".

The domain-member web application has functionality similar to the Linux "wget" application in that it can use the HTTP protocol to get files from HTTP servers if given the URL of the file. The domain-member web application was ported from the Linux wget code, and is written primarily using JNI (Java Native Interface) and makes calls directly into the bionic library, rather than going through Java classes.

Policy for the domain requires that any files transferred into the domain from internet sources be passed through the enterprise network servers for processing by virus scanners and logging of access. This requires the access to the URL not be done directly from the user's device, but through an enterprise proxy server. Rather than using the URL specified by the user, "HTTP://somesource.dom/dl/file.txt," the actual URL used must be "HTTP://proxyserver.enterprise.dom?URL=somesource.dom/dl/file.txt."

7.5.3 Implementation:

The enterprise domain administrator defines a policy that defines one or more aspects of a domain, including:

a. A private (e.g. encrypted) domain storage location on the local device.
b. Domain-member applications, comprising a web application with wget-like functionality, and an email application as applications that operate within the domain.
c. Network system credentials for accessing the enterprise's proxy server.

The domain policy is distributed through one or more policy management points which allocate it to policy enforcement points, which translate and enforce domain policy as follows (for example):

The private domain storage location is translated to a local, encrypted storage location (e.g. a file system) on the local device (internal storage or removable storage such as an SD card). The private domain storage is mapped and permissioned so it is accessible to domain applications.

The domain-member applications are defined, and domain-specific distributable policy enforcement points are generated for each domain-member application. Each of the domain-specific distributable policy enforcement points is downloaded and installed on the local device. If a domain-specific distributable policy enforcement point requires another application to be downloaded, that application is also downloaded and installed on the local device. Each domain-specific distributable policy enforcement point comprises policy-based redirection capability to redirect requests for configuration and local storage information to the private domain storage and to redirect network access requests as required by policy.

When a user selects a domain-member application for execution, they are actually selecting the domain-specific distributable policy enforcement point for the selected application. The domain-specific distributable policy application point operates as described above.

When the domain-member web application is requested by the user, the domain-specific distributable policy enforcement point is run, establishes the required process environment for policy enforcement, and gives control to the web application code. When the web application code requests connection to the "somesource.dom" host's port 80 (HTTP server port), the request is intercepted by the low-level library intercept of the distributable policy enforcement point. For example, when the connect( ) function is invoked to connect a local socket to the web server, the policy enforcement point intercept code diverts the call to a policy enforcement point function that examines the arguments, such as the peer address in the sockaddr structure, and determines whether it is permitted by policy. Because the web server address is an internet address, and not one assigned to an enterprise server or otherwise listed in policy as an acceptable destination address for a network connection, the request is not allowed by policy. Policy does not, however, require blocking the request, but permits modification of the request to re-route it to an enterprise proxy server. The request is modified to specify the enterprise proxy server address as the peer to connect to, and the call is then passed to the normal connect( ) function in the libc (bionic) library.

When the web application uses the established connection to send an HTTP "get" request, the request is sent through the established connection to the proxy server, which forwards it to the web server. When the web server returns the requested file, the proxy server does the required virus scanning and logging, and returns the file to the web application on the user's device. The file I/O call to write the file to the SD card is similarly intercepted and modified to redirect the file to the private domain storage where it can be accessed for sending by the domain-member email application as previously described.

7.5.4 Use:

The user invokes the domain-member web application, and enters the URL of the file on the internet web server as the file to get. The connection is re-routed through the enterprise proxy server, and the file, after vetting by the enterprise systems, is stored in the private domain storage on the user's device. The user then invokes the domain-member email application, composes the email, attaches the file from the web server to it, and sends the email to the colleague.

If the user had invoked a non-domain-member instance of the web application, the connection would not have been re-routed through the enterprise proxy server, and the file could not have been stored in the private domain storage area, so the domain-member email application could not have attached it to an email. The non-domain-member email instance could have attached the file, but would not have had access to the domain contacts data to determine the address to send to.

If the user had invoked the domain-member instance of the web application and acquired the file from the web server into the private domain storage area, a non-domain-member instance of the email application could not have accessed the file to send it.

The result is that the user can only send a version of the file that has been through the enterprise proxy server's processing if the file is to be sent using the enterprise contact information and the domain-member email application. The recipient of the email can be sure that the file has been processed by the enterprise proxy server if the file is received from the domain-member email application. This can be ensured by reading the email using a domain-member email application that receives email only from email servers specified by policy—the same email servers specified by policy for the domain-member email program that sent the email message.

7.6 Redirection of Domain Network Traffic Through a VPN
7.6.1 Features Demonstrated Policy-based per-application network redirection through a virtual private network (VPN).
Simultaneous use of VPN and non-VPN communications with a device.
A plurality of VPN Clients providing VPN communication with a device simultaneously.

7.6.2 Scenario

A user requests use of a first domain application that accesses a web server located on a corporate Intranet that policy requires be accessed through a VPN while also running a second application that accesses a web server located on the public internet without using a VPN. The device OS has the capability only for direct access or VPN access for all applications on the device at any given time. That is, if the VPN is enabled, all network access will go through the VPN, and if the VPN is not active, no network access will go through the VPN. A capability for splitting network access according to policy requirements on a per-application basis is needed. The alternative is to route all traffic through the VPN when a domain application requiring VPN access is running, but this would require that non-domain traffic be routed through the VPN server, which is not desirable for a number of reasons, including but not limited to privacy, bandwidth use, and security.

7.6.3 Implementation

Figure 11:
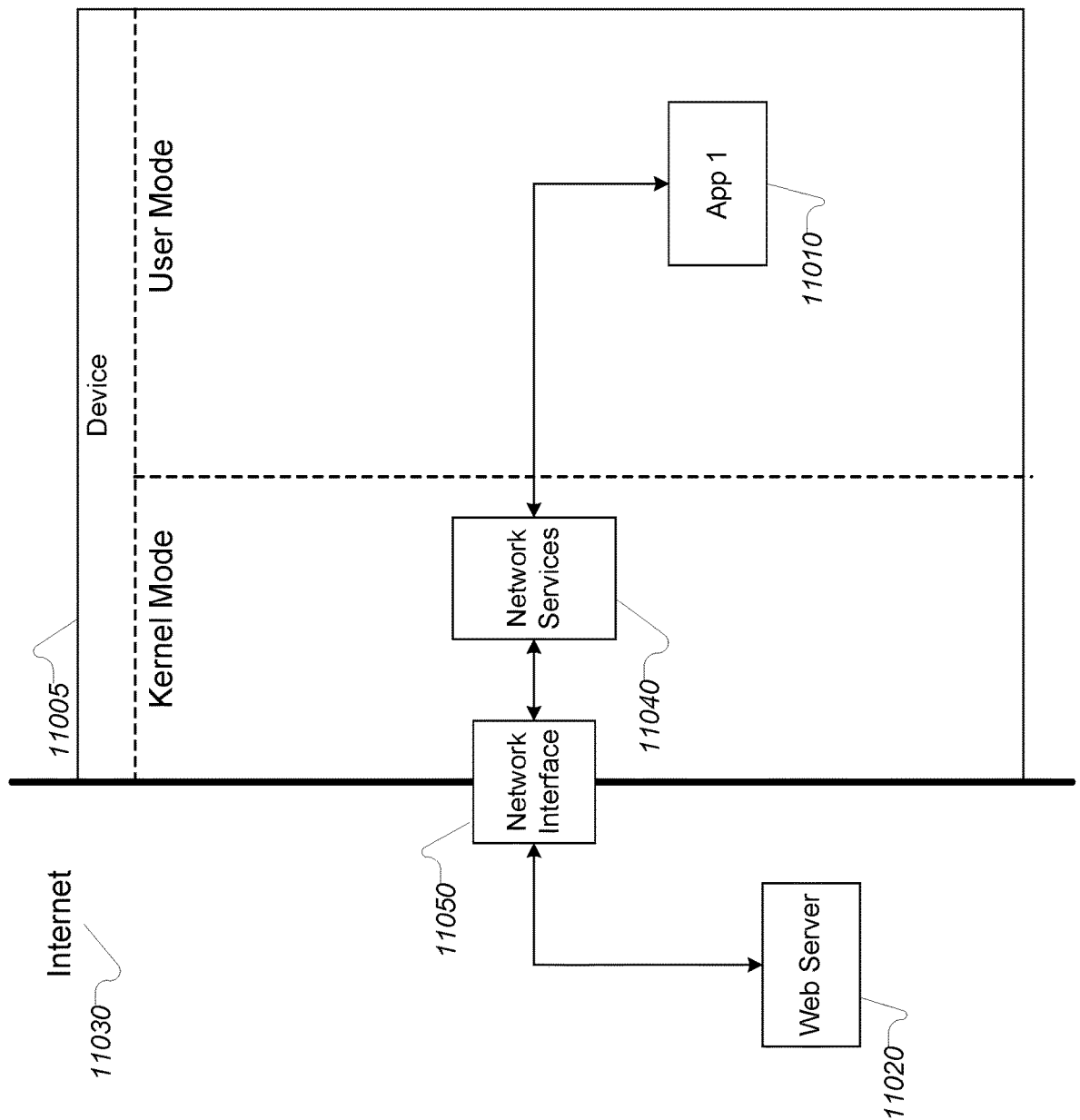
FIG. 11 depicts a diagram showing a typical prior art method for network communication between a device application and a networked server.

FIG. 11 shows a typical non-domain arrangement for a device (11005) application (11010) to access a web server (11020) located on the public internet (11030). The application (11010) creates a network socket using the OS-provided network services capability (11040) and connects it to the address of the web server (11020). Network data packets sent by the application (11010) are routed by aspects of the network services capability (11040) to a network interface (11050) that sends them across the public internet (11030) to the web server (11020). Network data packets sent by the web server (11020) to the application (11010) are directed back across the public internet (11030) to the network interface (11050), which passes them to the network services capability (11040), which makes them available through the network socket to the application (11010). The network services (11040) and network interface (11050) are typically running in kernel mode (a privileged CPU operating mode used by the device OS), while the application (11010) is typically running in user mode (a restricted CPU operating mode used by user applications).

Figure 12:
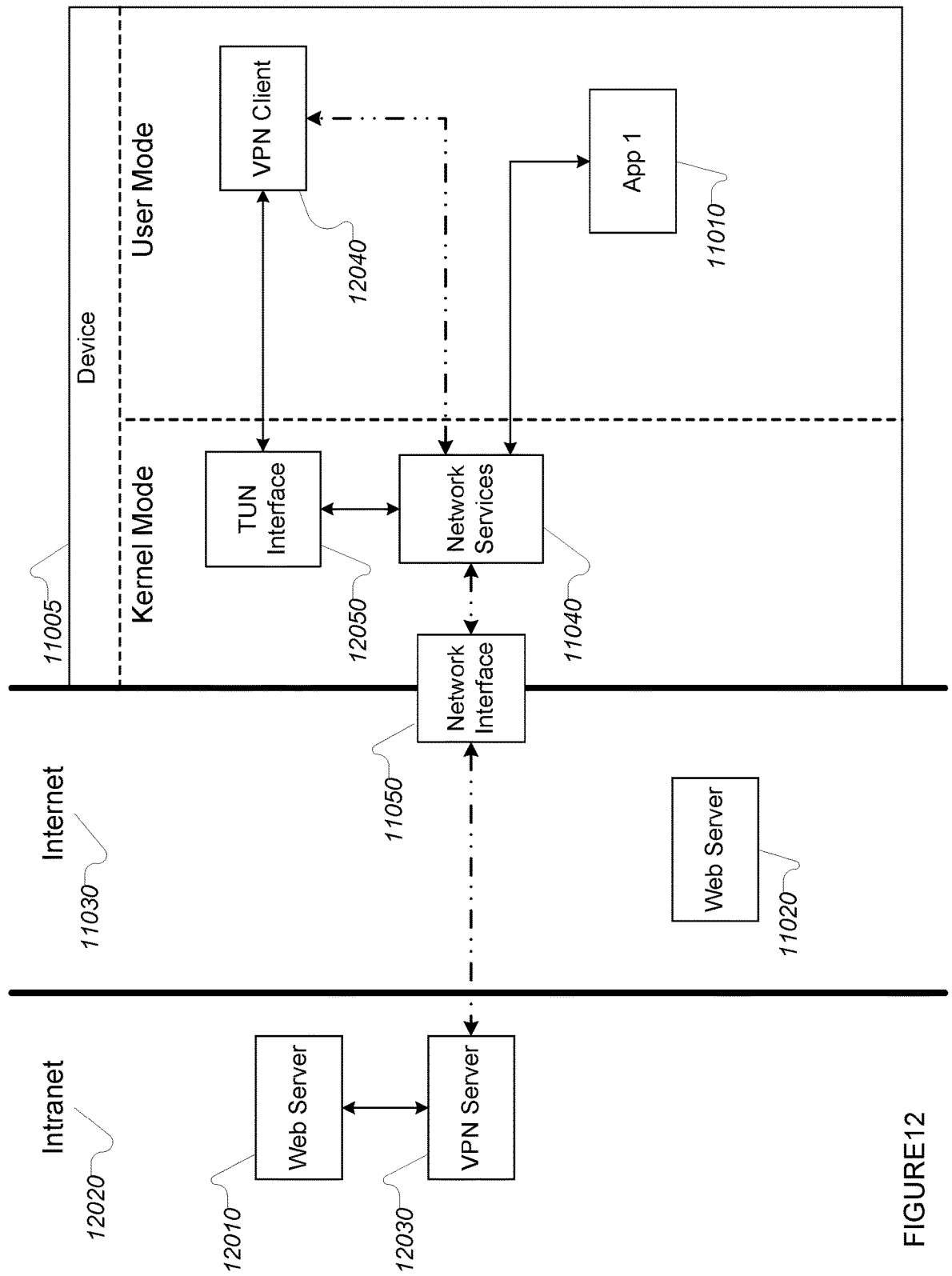
FIG. 12 depicts a diagram showing a typical prior art method for network communication between a device application and a networked server over a VPN connection.

FIG. 12 shows a typical non-domain arrangement on a device (11005) to enable an application (11010) to access a web server (12010) located on a corporate intranet (12020) through a VPN server (12030). Communications between a device (11005) and a VPN server (12030) are usually encrypted, and there can be protocol requirements for arranging session options that vary from one VPN system to another. The encryption, protocol requirements, and other needs of the VPN connection are handed by a VPN client (12040) on the device (11005). The VPN client is inserted into the path taken by network data packets sent from or to the device applications (11010). In some exemplary devices, such as Android OS devices, the VPN client is an application service running in user mode that has been given permission at install time, at run time, or at both times to provide VPN connectivity for device applications. The forgoing can be implemented by those having ordinary skill in the art.

For non-domain VPN access, a user typically starts an appropriate VPN client application (12040) in user mode. This application requests permission to take on VPN access duties. The request in some devices (11005) can involve the device user giving permission as well as the VPN client application (12040) being installed with permissions to do so. The request, when granted, results in creation of a virtual network interface in kernel mode, such as a "TUN" interface (12050). From the viewpoint of the OS network services capability (11040), the virtual network interface (12050) behaves just like a physical network interface (11050), but rather than using network interface hardware to send network data packets out of the device, the virtual network interface (12050) makes them available through a file descriptor to the requesting user-mode VPN client application (12040). The forgoing can be implemented by those having ordinary skill in the art.

When the non-domain VPN client application (12040) provides network data packets to the virtual network interface (12050) through the file descriptor, these are delivered to the network services capability (11040) for routing to an appropriate application based on the network packet headers, or for other processing, just as if they had arrived at the device through a hardware network interface (11050).

Granting of the VPN access duties request also results in the routing configuration of the network services capability (11040) being modified by aspects of the OS so as to route network data packets to the virtual network interface (12050) rather than to another network interface (11050). This causes network traffic from applications on the device (11005) to flow through the virtual network interface (12050) to the VPN client application (12040). The VPN client application encrypts the network data packets and sends them through a network connection to a VPN server (12030). The network connection between the VPN client application (12040) and the VPN server (12030) is created by the VPN client in such a way that the network data packets sent over it are not routed through the virtual network interface (12050), but are sent instead through the hardware network interface (11050), enabling the VPN client application (12040) to exchange packets over the public internet (11030). The VPN client application (12040) uses this socket to connect to the VPN server (12030) and exchange configuration and session information, as well as encrypted data packets, as required by the relevant protocols. The VPN server (12030) decrypts the data in the encrypted network data packets back into normal network data packets and sends them out on its own network interfaces to the destination host (12010).

When the destination host (12010) sends back network data packets, these are routed to the VPN server (12030), which encrypts them and sends them to the device's hardware network interface (11050). Network packets arriving at the device from the VPN server (12030) through hardware interfaces (11050) are routed through the virtual network interface (12050) to the VPN client (12040) where the data they contain are decrypted back into normal network data packets and sent back through the virtual network interface's file descriptor to the virtual network interface (12050), which hands them off to network services (11040), which routes them to the appropriate application (11010) based on their network packet headers in the normal way. To the device application (11010) and the network host (12010) it is communicating with, the VPN processing is transparent, and each sees normal network data packets being sent and received normally, but all data leaving the device and the VPN server for the device is encrypted within the network data packets that transport it.

Continuing with the non-domain VPN case, when a network packet is sent from the application (11010) through its network socket, network services (11040) routes it to the virtual interface (12050), which makes it available through the file descriptor to the VPN client application (12040). The VPN client application encrypts the application's network data packet, and sends it through its own network socket, where it is routed by network services (11040) through the hardware network interface (11050), over the public internet (11030) to the VPN server (12030) running on the corporate intranet (12020). The VPN server (12030) decrypts the application's network data packet and puts it onto the intranet (12020) where it is routed to the intranet web server (12010).

Data packets sent back from the intranet web server (12010) are routed to the VPN server (12030), which encrypts them and sends them back through the public internet (11030) to the hardware network interface of the device (11050), which passes them to network services (11040), which routes them to the virtual interface (12050), which passes them through the file descriptor to the VPN client application (12040) where they are decrypted and passed back through the file descriptor to the virtual interface (12050), which hands them to network services (11040), which routes them to the application (11010) through its network socket.

Figure 13:
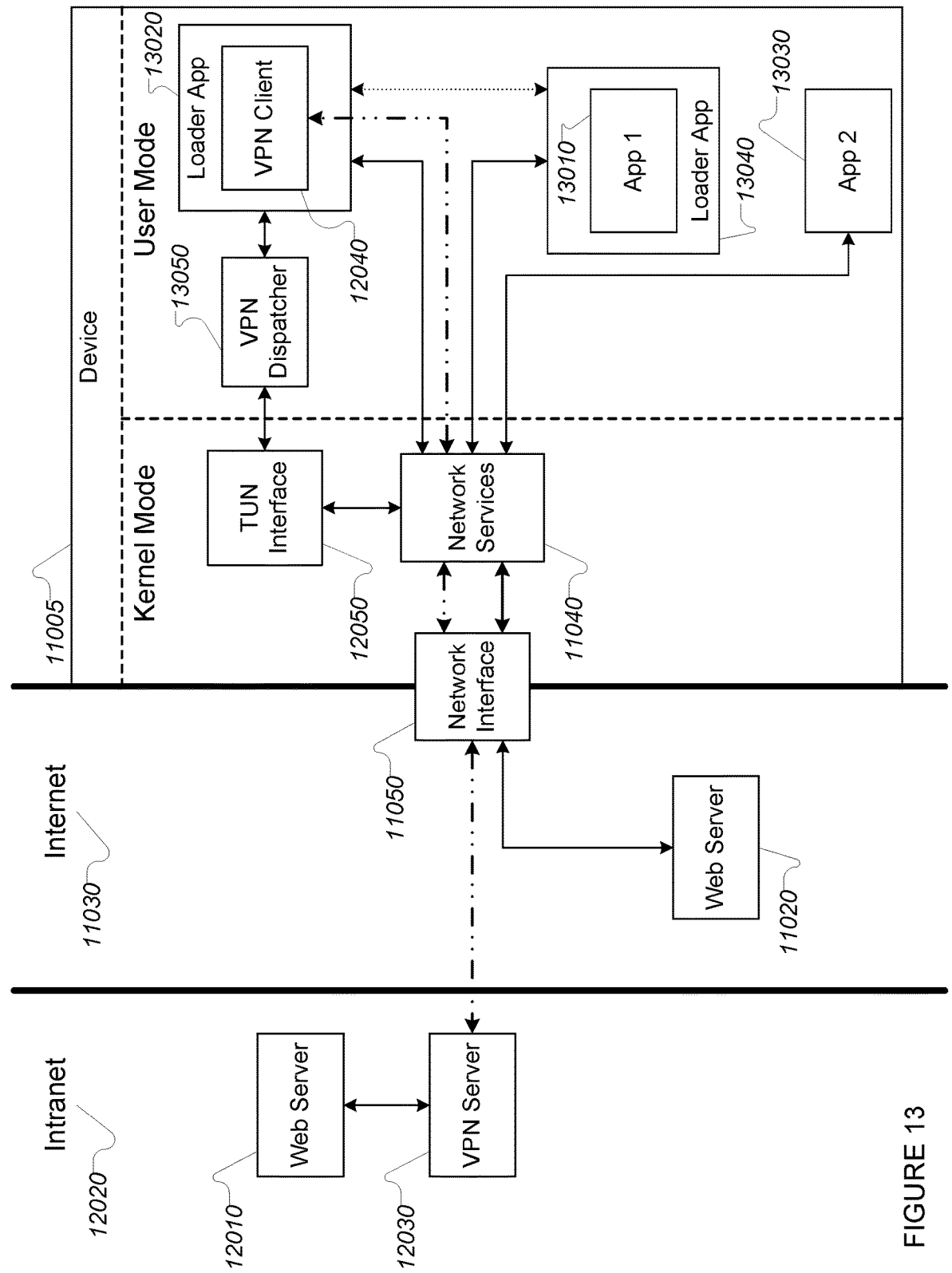
FIG. 13 depicts a diagram showing an exemplary method for network communication between a device application and a networked server on an application-by-application basis according to one embodiment of the invention.

The arrangement of FIG. 12 is modified in the exemplary embodiment of a domain case, shown in FIG. 13, by arranging to moderate the domain application and the VPN client application. This can be accomplished in some exemplary embodiments by use of Loader applications. In some other exemplary embodiments other methods described herein, such as modification of the OS (e.g. network services) are used. The Loader application method will be described in this example.

In addition to Loader applications, a policy enforcement point, referred to in this example as a "VPN dispatcher" (13050), is added. The VPN dispatcher (13050) can support a plurality of VPN client applications, or other types of client applications, simultaneously, each running in a Loader application, enabling use of a plurality of VPN technologies, or other technologies such as ZRTP encryption for VoIP connections, filtered firewalling, etc., from a device at the same time, whether the device OS provides support for this or not. This policy enforcement point can be implemented in some exemplary embodiments in its own process. In other exemplary embodiments the VPN dispatcher policy enforcement point can be implemented as part of a policy management point as described herein. In yet other exemplary embodiments the VPN dispatcher policy enforcement point (13050) can be implemented as part of one or more cooperating Loader applications that are also used to moderate VPN clients (e.g. 13020). In still other exemplary embodiments, the VPN dispatcher (13050) can be implemented in kernel mode as part of the virtual interface (12050), in network services (11040), or in parts of the OS, however such methods typically require privileged access to the OS, which is not required by the Loader application methods where the VPN dispatcher (13050) runs in user mode. The VPN dispatcher (13050) will be described here as a separate user mode application, but such description is not intended to suggest a preferred implementation method, because the best method will vary with device and OS characteristics and the best method for a given device will be apparent to those with skill in the art. The VPN dispatcher (13050) is used to exchange network data packets with the virtual network interface (12050) through the file descriptor provided, and to route packets to or from the Loader applications of one or more VPN clients (13020). Network data packets are exchanged with these Loader applications using file descriptors provided by the VPN dispatcher (13050) to each. The forgoing can be implemented by those having ordinary skill in the art.

The VPN dispatcher (13050) can route network data packets to the proper VPN client Loader application (13020) based on the addresses in the packet headers in a manner similar to that used by Network Address Translation (NAT) routers. This involves keeping track of the addresses associated with the connections that have been opened by each Loader application and its VPN client application. The VPN dispatcher (13050) has access only to the network headers of each network data packet, as the data portions of each packet are typically encrypted by the VPN server (12030) or VPN client (12040) that sent them.

The VPN dispatcher (13050) file descriptor provided for use by the VPN client (12040) is for receiving and sending packets just as the virtual network interface (12050) does, but packets written to this interface are read by the VPN dispatcher (13050) and those written by the VPN dispatcher (13050) are read by the VPN client (12040) if moderation by the Loader application of the VPN client (13020) permits this.

Any network data packets that are provided by the virtual network interface (12050) to the VPN dispatcher (13050) that are not involved in a VPN link, or other link that requires processing by a client application (e.g. ZRTP VoIP encryption, firewall filtering, etc.) are handed back to the virtual network interface (12050) by the VPN dispatcher (13050) through the virtual network interface's file descriptor. The virtual network interface passes these to Network Services (11040), which routes them to the appropriate process.

Domain VPN use is requested by the user executing the Loader application associated with the VPN client application (13020), which establishes the required process environment and then loads the VPN client application (12040) as described elsewhere herein. The Loader application of the VPN client application (13020) checks for an existing VPN dispatcher (13050). If a VPN dispatcher (13050) is found, the Loader application of the VPN client application (13020) uses IPC with the VPN dispatcher (13050) to request a file descriptor for use in passing network data packets to and from the virtual network interface (12050), or for other communications, such as coordination between the processes, alerts concerning VPN shutdown, etc. If no existing VPN dispatcher (13050) is found, the Loader application of the VPN client application (13020) requests the creation of a VPN dispatcher (13050), which in turn requests permission to take on VPN access duties. If permission is granted, the virtual network interface (12050) is created, network routing is altered to send network packets through the virtual network interface (12050), and the file descriptor used to exchange network data packets with the virtual network interface from user mode is provided to the VPN dispatcher (13050). The VPN client (12040) establishes a socket connection that is routed through the hardware network interface (11050) as described above for FIG. 12, however, in this case the socket connection is moderated by the VPN client's Loader application (13020) as required by domain policy.

The VPN client's Loader application (13020) also moderates attempts by the VPN client to assume VPN duties for the device, because this is handled by the VPN dispatcher (13050). Such attempts are blocked, and the VPN client's Loader application responds to the VPN client's attempt by providing the expected file descriptor, but in this case the file descriptor is not monitored by the virtual network interface (12050), but by the VPN client's Loader application (13020) so that it can moderate network data packets sent from or to the VPN client.

The Loader application moderates activity of the VPN client as required by policy, such as by limiting or redirecting the network socket connection to a specific VPN server address, restricting the times at which access is permitted or the locations or internet connectivity required. The Loader application of the VPN client (13020) also can moderate access to the file descriptor connecting the VPN Client (12040) to the virtual network interface (12050), for example, to restrict application network data packets sent through the VPN to those sent by domain applications such as App 1 (13010). Network data packets sent by non-domain applications, such as App 2 (13030) are intercepted by the Loader application of the VPN client (13020) as they arrive through the file descriptor and can be sent through a network socket created by the Loader application, which is also a protected socket that is not routed through the virtual network interface (12050), to the hardware interface (11050)

and out through the public internet (11030). In this way domain communications are routed through the domain VPN, as required by policy, but non-domain communications can be routed out onto the public internet and not sent through the domain VPN when that is the policy-required behavior. VPN routing is therefore done on an application-by-application basis, whether the applications are domain applications or non-domain applications, and domain application communications are performed or blocked according to domain policy.

In some exemplary embodiments it is possible to operate a plurality of VPN connections, using a plurality of VPN protocols, simultaneously using these methods. By using Loader applications to start a plurality of VPN clients of different types, and distributing incoming network data packets to them through a VPN dispatcher (13050), and moderating their socket and file descriptor access, a plurality of VPN connections and non-VPN connections can be supported simultaneously, even on devices where the OS does not provide support for such a capability directly. This improves the flexibility of use of the device for the user, without compromising the privacy of domain data.

In some devices, the user can shut down VPN access at any time, which causes the virtual network interface (12050) to be removed, the VPN dispatcher service or application to be stopped, and network traffic to revert to being routed through the hardware network interface (11050) without any change to the network sockets of applications. To avoid sending domain data across non-VPN connections in violation of policy, the Loader applications of the domain applications (13040) are enabled to receive broadcast or unicast alerts from the VPN dispatcher (13050) and/or the Loader application of the VPN client(s) (13020). When the user shuts down VPN access, the VPN dispatcher will be stopped, and receiving the command to stop causes the VPN dispatcher to alert the Loader applications of the VPN clients (13020), which respond by shutting down the VPN client applications (12040), and the domain application Loader applications (13040), which respond by blocking network access to their applications (13010). Non-domain applications (13030) are not affected, and continue to have network access as they did prior to the domain VPN setup being established.

7.6.4 Use

The user starts a domain application (13010) that requires access to an intranet web server (12010). Policy for the domain requires that this connection be done through a domain VPN connection. The Loader application of the domain application (13040) requests establishment of a domain VPN connection. This causes the VPN dispatcher to be run, which starts the domain VPN Loader application (13020), which loads the VPN client application (12040), which requests assumption of VPN duties for the device and establishes the domain VPN connection to the corporate VPN Server (12030), enabling the domain application (13010) to operate. Another, non-domain, application on the device (13030) continues to have non-VPN access to a public web server (11020).

When the user shuts down VPN access, the non-domain application (13030) is not affected, but the domain application's (13010) access to the network is blocked by its Loader application (13040), which was alerted to the VPN shutdown by the VPN dispatcher (13050) and/or the VPN client application's Loader application (13020). Domain data is therefore not sent over the public internet in unencrypted form, but non-domain activities are not affected.

8 CONCLUSION

Thus, those having ordinary skill in the art will appreciate that the present invention meets the needs described above and possesses still more useful aspects and applications. A number of implementations of the invention have been described. Nevertheless, it will be understood that various modifications can be made without departing from the spirit and scope of the invention. Accordingly, other embodiments are within the scope of the description herein.

What is claimed is:

1. A method for use of a computer device in two or more data security domains, the method comprising:
   associating a first computer data processing device application with a first domain that is defined according to an external policy;
   bounding a first loader application to the first computer data processing device application, wherein the first loader application is configured to intercept and mediate requests between the first computer data processing device application and an operating system according to specifications of the external policy of the first domain without modifying the first computer data processing device application and without requiring operating system privileges, and the first loader application is located logically between the first computer data processing device application and the operating system;
   associating a first virtual private network ("VPN") client application with the first domain;
   binding a second loader application to the first VPN client application, wherein the second loader application is configured to moderate activity of the first VPN client application according to specifications of the external policy of the first domain; and
   in response to network data packets being in accordance with specifications of policies of the first domain at a first domain import-export policy enforcement point between first computer data processing device application and the first VPN client application, exchanging the network data packets from the first computer data processing device application to the first VPN client application.

2. The method of claim 1, further comprising:
   sending network data packets from the first computer data processing device application to the first domain import-export policy enforcement point;
   verifying at the first domain import-export policy enforcement point that the network data packets conform to the specifications of the policies of the first domain;
   responsive to the network data packets conforming to the specifications, sending normal network data packets from the first domain import-export policy enforcement point to the first VPN client application;
   encrypting the network data packets by the first VPN client application; and
   sending the encrypted network data packets to a VPN server.

3. The method of claim 2, further comprising:
   decrypting the encrypted network data packets by the VPN server;
   sending the network data packets to a web server;
   sending a response from the web server to the VPN server;

encrypting the response by the VPN server;
sending the encrypted response to the first VPN client application;
decrypting the encrypted response by the first VPN client application; and
sending the response from the first VPN client application to the first computer data processing device application.

4. The method of claim 3, wherein:
the network data packets are sent from the first computer data processing device application to the first VPN client application through a virtual network interface;
the encrypted network data packets are sent from the first VPN client application through a hardware network interface; and
the encrypted response is sent from the VPN server to the first VPN client application through the hardware network interface and a virtual network interface.

5. The method of claim 4, further comprising associating a second computer data processing device application with a second domain defined according to a second external policy, wherein the second domain has different security protocols and permissions than the first domain.

6. The method of claim 1, further comprising:
associating a second VPN client application to a second domain,
binding the second VPN client application to a third loader application, wherein the first domain import-export policy enforcement point is in communication with the first VPN client application and the second VPN client application;
determining an address in a packet header of the network data packets received at the first domain import-export policy enforcement point; and
exchanging the network data packets to the first VPN client application or the second VPN client application based on the address in the packet headers.

7. The method of claim 6, wherein the first domain import-export policy enforcement point supports the first VPN client application or the second VPN client application simultaneously.

8. The method of claim 1, further comprising:
sending non-domain network data packets from a non-domain computer data processing device application to the first domain import-export policy enforcement point, wherein the non-domain computer data processing device applications is unassociated with any domain;
verifying by the first domain import-export policy enforcement point that the non-domain network data packets conform to the specifications of the policies of the first domain; and
sending the non-domain network data packets from the first domain import-export policy enforcement point to the first VPN client application.

9. The method of claim 8, further comprising:
intercepting the non-domain network data packets by the second loader application as the non-domain network data packets arrive through a file descriptor; and
sending the non-domain network data packets through a network socket created by the second loader application to a web server over a public internet.

10. The method of claim 9, wherein:
the non-domain network data packets are sent from the second VPN client application to the web server through a hardware network interface; and
the sending the non-domain network data packets over the public internet bypasses the VPN client.

11. A non-transitory computer-readable medium having encoded therein programming code executable by one or more processors to perform or control performance of operations for use of a computer device in two or more data security domains, the operations comprising:
associating a first computer data processing device application with a first domain that is defined according to an external policy;
bounding a first loader application to the first computer data processing device application, wherein the first loader application is configured to intercept and mediate requests between the first computer data processing device application and an operating system according to specifications of the external policy of the first domain without modifying the first computer data processing device application and without requiring operating system privileges, and the first loader application is located logically between the first computer data processing device application and the operating system;
associating a first virtual private network ("VPN") client application with the first domain;
binding a second loader application to the first VPN client application, wherein the second loader application is configured to moderate activity of the VPN client application according to specifications of the external policy of the first domain; and
in response to network data packets being in accordance with specifications of policies of the first domain at a first domain import-export policy enforcement point between first computer data processing device application and the first VPN client application, exchanging the network data packets from the first computer data processing device application to the first VPN client application.

12. The non-transitory computer-readable medium of claim 11, wherein the operations further comprise:
sending network data packets from the first computer data processing device application to the first domain import-export policy enforcement point;
verifying at the first domain import-export policy enforcement point that the network data packets conform to the specifications of the policies of the first domain;
responsive to the network data packets conforming to the specifications, sending normal network data packets from the first domain import-export policy enforcement point to the first VPN client application;
encrypting the network data packets by the first VPN client application; and
sending the encrypted network data packets to a VPN server.

13. The non-transitory computer-readable medium of claim 12, wherein the operations further comprise:
decrypting the encrypted network data packets by the VPN server;
sending the network data packets to a web server;
sending a response from the web server to the VPN server;
encrypting the response by the VPN server;
sending the encrypted response to the first VPN client application;
decrypting the encrypted response by the first VPN client application; and
sending the response from the first VPN client application to the first computer data processing device application.

14. The non-transitory computer-readable medium of claim 13, wherein:
the network data packets are sent from the first computer data processing device application to the first VPN client application through a virtual network interface;
the encrypted network data packets are sent from the first VPN client application through a hardware network interface; and
the encrypted response is sent from the VPN server to the first VPN client application through the hardware network interface and a virtual network interface.

15. The non-transitory computer-readable medium of claim 14, wherein:
the operations further comprise associating a second computer data processing device application with a second domain defined according to a second external policy; and
the second domain has different security protocols and permissions than the first domain.

16. The non-transitory computer-readable medium of claim 11, wherein the operations further comprise:
associating a second VPN client application to a second domain,
binding the second VPN client application to a third loader application, wherein the first domain import-export policy enforcement point is in communication with the first VPN client application and the second VPN client application;
determining an address in a packet header of the network data packets received at the first domain import-export policy enforcement point; and
exchanging the network data packets to the first VPN client application or the second VPN client application based on the address in the packet headers.

17. The non-transitory computer-readable medium of claim 16, wherein the first domain import-export policy enforcement point supports the first VPN client application or the second VPN client application simultaneously.

18. The non-transitory computer-readable medium of claim 11, wherein the operations further comprise:
sending non-domain network data packets from a non-domain computer data processing device application to the first domain import-export policy enforcement point, wherein the non-domain computer data processing device applications is unassociated with any domain;
verifying by the first domain import-export policy enforcement point that the non-domain network data packets conform to the specifications of the policies of the first domain; and
sending the non-domain network data packets from the first domain import-export policy enforcement point to the first VPN client application.

19. The non-transitory computer-readable medium of claim 18, wherein the operations further comprise:
intercepting the non-domain network data packets by the second loader application as the non-domain network data packets arrive through a file descriptor; and
sending the non-domain network data packets through a network socket created by the second loader application to a web server over a public internet.

20. The non-transitory computer-readable medium of claim 19, wherein:
the non-domain network data packets are sent from the second VPN client application to the web server through a hardware network interface; and
the sending the non-domain network data packets over the public internet bypasses the VPN client.

\* \* \* \* \*